(12) United States Patent
Judas et al.

(10) Patent No.: US 10,131,426 B2
(45) Date of Patent: Nov. 20, 2018

(54) AIRCRAFT CAPABLE OF VERTICAL TAKE-OFF

(71) Applicant: Airbus Defence and Space GmbH, Taufkirchen (DE)

(72) Inventors: Michael Judas, Munich (DE);
Friederike Stratenberg, Ingolstadt (DE); Jan Van Toor, Munich (DE);
Werner Scholz, Ohmden (DE);
Berthold Karrais, Epfendorf (DE);
Wolfgang Stangl, Munich (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 214 days.

(21) Appl. No.: 14/915,101

(22) PCT Filed: Aug. 29, 2014

(86) PCT No.: PCT/EP2014/068410
§ 371 (c)(1),
(2) Date: Feb. 26, 2016

(87) PCT Pub. No.: WO2015/028627
PCT Pub. Date: Mar. 5, 2015

(65) Prior Publication Data
US 2016/0207625 A1    Jul. 21, 2016

(30) Foreign Application Priority Data

Aug. 29, 2014    (DE) .................. 10 2013 109 392

(51) Int. Cl.
*B64C 27/08*    (2006.01)
*B64C 29/00*    (2006.01)
(Continued)

(52) U.S. Cl.
CPC ............ *B64C 29/0025* (2013.01); *B64C 3/38* (2013.01); *B64C 5/08* (2013.01); *B64C 27/08* (2013.01);
(Continued)

(58) Field of Classification Search
CPC ......... B64C 29/0025; B64C 3/38; B64C 5/08; B64C 27/08; B64C 27/473; B64C 39/024; B64C 39/08
See application file for complete search history.

(56) References Cited

U.S. PATENT DOCUMENTS 3,181,810 A * 5/1965 Olson ................. B64C 29/0033
244/66
3,592,412 A * 7/1971 Glatfelter ............ B64C 29/0033
244/7 A
(Continued)

FOREIGN PATENT DOCUMENTS

DE            6602227 U    4/1969
DE    10 2005 040 887 A1    6/2006
(Continued)

OTHER PUBLICATIONS

European Office Action issued in European counterpart application No. 14 756 074.2-1754 dated Apr. 10, 2017 (Five (5) pages).
(Continued)

*Primary Examiner* — Justin M Benedik
(74) *Attorney, Agent, or Firm* — Crowell & Moring LLP

(57) ABSTRACT

The invention relates to an aircraft which can both take off and land vertically and can hover and also fly horizontally at a high cruising speed. The aircraft has a support structure, a wing structure, at least three and preferably at least four lifting rotors and at least one thrust drive. The wing structure is designed to generate a lifting force for the aircraft during horizontal motion. To achieve this the wing structure has at
(Continued)

least one mainplane provided with a profile that generates dynamic lift. The wing structure is preferably designed as a tandem wing structure. Each of the lifting rotors is fixed to the support structure, has a propeller and is designed to generate a lifting force for the aircraft by means of a rotation of the propeller, said force acting in a vertical direction. The thrust drive is designed to generate a thrust force on the support structure, said force acting in a horizontal direction. The lifting rotors can have a simple construction, i.e. they can have a simple rigid propeller for example, and a vertical take-off or hovering of the aircraft can be controlled, in a similar manner to quadcopters, by a simple control of the speeds of the lifting rotors. High cruising speeds can be achieved as a result of the additional horizontally acting thrust drive.

14 Claims, 12 Drawing Sheets

(51) Int. Cl.
    *B64C 3/38*     (2006.01)
    *B64C 5/08*     (2006.01)
    *B64C 27/473*     (2006.01)
    *B64C 39/02*     (2006.01)
    *B64C 39/08*     (2006.01)
    *B64D 27/02*     (2006.01)
    *B64D 27/24*     (2006.01)

(52) U.S. Cl.
    CPC .......... *B64C 27/473* (2013.01); *B64C 39/024* (2013.01); *B64C 39/08* (2013.01); *B64D 27/02* (2013.01); *B64D 27/24* (2013.01); *B64C 2201/104* (2013.01); *B64C 2201/108* (2013.01); *B64C 2201/165* (2013.01); *B64D 2027/026* (2013.01)

(56) References Cited

U.S. PATENT DOCUMENTS

| | | | |
|---|---|---|---|
| 6,292,491 B1 | 9/2001 | Wobben | |
| 8,152,096 B2* | 4/2012 | Smith | B64C 29/0033 244/12.4 |
| 9,120,560 B1* | 9/2015 | Armer | B64C 29/0008 |
| 9,187,174 B2* | 11/2015 | Shaw | B64C 27/28 |
| 2003/0062443 A1* | 4/2003 | Wagner | B64C 3/56 244/12.3 |
| 2004/0245374 A1* | 12/2004 | Morgan | B64C 5/02 244/12.3 |
| 2006/0151666 A1 | 7/2006 | VanderMey et al. | |
| 2011/0001020 A1 | 1/2011 | Forgac | |
| 2011/0042508 A1 | 2/2011 | Bevirt | |
| 2012/0234968 A1* | 9/2012 | Smith | B64C 29/0033 244/12.3 |
| 2013/0020429 A1* | 1/2013 | Kroo | B64C 3/16 244/6 |
| 2013/0062455 A1 | 3/2013 | Lugg et al. | |

FOREIGN PATENT DOCUMENTS

| | | |
|---|---|---|
| DE | 10 2009 048 201 A1 | 4/2011 |
| DE | 10 2012 021 339 A1 | 4/2014 |
| EP | 2 011 962 A2 | 1/2009 |
| KR | 10 2012 006 05 90 A | 6/2012 |
| RU | 2001836 C1 | 10/1993 |
| RU | 2 543 120 C1 | 2/2015 |
| WO | WO 2004/012993 A1 | 2/2004 |
| WO | WO 2006/113877 A2 | 10/2006 |
| WO | WO 2015/028627 A1 | 3/2015 |

OTHER PUBLICATIONS

Russian Search Report issued in Russian counterpart application No. 2016111409/11(017972) dated Sep. 22, 2017 (Six (6) pages).
European Search Report issued in European counterpart application No. 15178886.6-1754 dated Jan. 19, 2016, with Statement of Relevancy (Eight (8) pages).
PCT/EP2014/068410, International Search Report dated Nov. 14, 2014 (Three (3) pages).
Russian Search Report issued in Russian counterpart application No. 2016130683/11(047707) dated Dec. 8, 2017 (Six (6) pages).
Chinese Third Office Action issued in Chinese counterpart application No. 201480047862.8 dated Jan. 2, 2018, with partial English translation (Eleven (11) pages).

* cited by examiner

AIRCRAFT CAPABLE OF VERTICAL TAKE-OFF

CROSS REFERENCE TO RELATED APPLICATIONS

The present application is a National Stage of International Application No. PCT/EP2014/068410, filed Aug. 29, 2014, which claims the priority of German patent application No. 10 2013 109 392.2, filed on 29 Aug. 2013, the entire disclosures of which is hereby incorporated by reference.

FIELD OF THE INVENTION

The present invention relates to an aircraft capable of vertical take-off, for example similar to a tricopter or a quadcopter.

BACKGROUND OF THE INVENTION

For many uses, it is desirable to have available an aircraft which can take-off from a very small surface and which therefore does not require a specific large airport for example. Furthermore, for particular purposes of use, an aircraft is required which is agile, which can be maneuvered precisely and which can preferably hover on the spot and, in this respect, can have good hover flight characteristics.

For example, aircraft are used for aerial surveillance and aerial reconnaissance, which aircraft hover above an object of interest and while so doing are able to record aerial images, for example. In an alternative use, an aircraft capable of vertical take-off, sometimes also called VTOL (vertical take-off and landing), can be used to approach territories which cannot be easily accessed by people or miscellaneous machines, for example as part of a disaster management intervention, to be able to transport goods, such as tools, food or medicines, into such territories.

Aircraft have been developed for such uses, inter alia, in which at least three, preferably four or more rotors fitted with a propeller and a motor driving said propeller respectively provide a substantially vertically upwardly directed thrust to thereby allow the aircraft to be able to take off vertically or to hover. An aircraft provided with four rotors of this type is also known as a quadcopter, quadrocopter, quadricopter, quadrotor or hover platform. Aircraft of this type having more than three thrust-providing rotors are generally known as multicopters and, in addition to quadcopters, variants with three rotors (tricopters), six rotors (hexacopters) or eight rotors (octocopters) are also common. Aircraft of this type are generally operated unmanned and thus can be small. These aircraft are sometimes also called drones.

By slightly inclining the entire aircraft or one or more rotors out of the horizontal, it is possible in aircraft of this type to also provide a particular propulsion in which a thrust generated by the rotors is inclined out of the vertical. However, cruising speeds which are achievable in this manner are restricted to relatively low speeds of typically less than 200 km/h, often even less than 100 km/h, due to physical boundary conditions which arise in this type of aircraft. A speed restriction of this type results, for example from the physical boundary condition that the propellers used for lift are operated at high rotational speeds, and therefore a propeller blade moving forwards in the direction of flight of the aircraft must move almost at sonic speed at least at the tips of the propeller blade even at relatively low cruising speeds, as a result of which a high air resistance and a loud noise are generated.

Therefore, although conventional multicopters have good hover characteristics like helicopters in which only a single rotor provides the necessary lift and complicated rotor mechanics can be used together with a tail rotor for maneuvering the helicopter, they usually only achieve relatively low cruising speeds.

KR 10 2012 006 05 90 A discloses a quadrocopter which can take off and land vertically and in which a thrust direction can be varied by propellers to be able to provide not only lift, but also propulsion for the quadrocopter.

SUMMARY OF THE INVENTION

It can be considered as an object of the present invention to provide an aircraft which allows both good hover characteristics and high cruising speeds.

According to one aspect of the present invention, an aircraft is proposed which has a support structure, a wing structure, at least three lifting rotors and at least one thrust drive. The wing structure is attached to the support structure. The wing structure can also be part of the support structure of the aircraft. The wing structure is configured to generate a lifting force for the aircraft during horizontal motion of the aircraft and for this purpose has at least one aerofoil which is provided with a profile generating dynamic lift. Each of the lifting rotors is attached to the support structure. Each lifting rotor has a propeller and is configured to generate a lifting force, acting vertically, for the aircraft by rotation of the propeller. The thrust drive is configured to generate a thrust, acting horizontally, on the support structure.

In short, one idea underlying the invention can be seen, inter alia, in fitting an aircraft in the form of a multicopter on the one hand with at least three lifting rotors which generate a vertical thrust, by which the aircraft can take-off and land vertically and can also hover, and also on the other hand in providing a thrust drive which can generate a horizontally acting thrust so that the aircraft can be accelerated to a high cruising speed independently of the lifting rotors after the rotors have stopped. The aircraft is also provided with a wing structure in which at least one aerofoil provides dynamic lift when the aircraft has been accelerated to a sufficiently high cruising speed.

The aerofoil or aerofoils of the wing structure are preferably configured such that they alone can provide adequate lift for the aircraft at cruising speeds to be achieved by the aircraft and it is thereby possible to dispense with a lift generated by the lifting rotors at cruising speed.

The aerofoils can be attached swivelably or rotatably, for example, to the support structure or to a fuselage so that during a hover state or while hovering, they are in a swivelled-out state and while cruising, they are in a swivelled-in state. In this respect, the swivelling-out of the aerofoils increases the sweep of the wing structure and the swivelling-in reduces the sweep. The sweep describes an angle between a leading edge of the respective aerofoil and a transverse axis of the aircraft. With regard to the direction of flight, it is possible to differentiate between negative sweep, i.e. forwardly swept aerofoils, and positive sweep, i.e. backwardly swept aerofoils. This connection will be explained in more detail in the description of the drawings.

Furthermore, configurations of the aircraft with three aerofoils or pairs of aerofoils can be provided. The aerofoils can also be interconnected by connecting structures or connecting elements, as is the case for coleopters, for example. The propellers can be attached to the connecting structures or connecting elements by arms or nacelles. The propellers are preferably attached to the aerofoils, to the support structure, to arms, connecting structures, connecting elements or to nacelles.

An aircraft according to the invention, which is provided with a combination of at least three lifting rotors and at least one thrust drive as well as a suitably configured wing structure, can have the desired good hover characteristics and can also achieve high cruising speeds. For example, during take-off or landing or during hover flight, i.e. when there is a lack of or only slight horizontal speed of the aircraft, the lifting rotors can provide the necessary lift. Independently of the lifting rotors, the thrust drive can accelerate the aircraft in the horizontal direction and, with adequately high horizontal speeds, a dynamic lift generated by the at least one aerofoil of the wing structure can be high enough to support the aircraft.

The individual components of the proposed aircraft can be configured and controlled relatively simply. In particular, the lifting rotors can be configured such that a plane of rotation, in which rotor blades of a lifting rotor rotate, is stationary relative to a motor-driven shaft of the lifting rotor.

In other words, the lifting rotors of the aircraft can be of a simple mechanical construction and, for example, a simple propeller can be directly coupled to a motor-driven shaft. In particular, it is unnecessary to connect rotor blades of the lifting rotor to a motor-driven rotor shaft by a complicated mechanism, for example by a swash plate as in the case of a helicopter. In particular, it is unnecessary to change an angle of incidence or inclination angle of individual rotor blades during a rotor revolution in order to thus also provide propulsion of the aircraft or rolling, pitching or yawing of the aircraft. Instead, propulsion of the proposed aircraft can be achieved by the additional thrust drive. Rolling, pitching or yawing of the aircraft can be achieved by varying the lifting forces respectively generated by the usually at least four lifting rotors.

In a particularly simple configuration, the propeller blades of a lifting rotor can be rigidly connected to the rotor shaft. A propeller provided thus with rigid blades has no movable parts. It is thus robust and, for example, does not require any mechanism or control means to be able to control a variable arrangement of propeller blades. In particular, the propeller can be integral. The lifting force generated by a simply constructed lifting rotor of this type mainly depends on the rotation speed or speed at which the propeller is driven and can thus be simply controlled by a suitable control of the driving motor.

Alternatively, the lifting rotor can be more complex and propeller blades of the lifting rotor can be connected swivelably to the rotor shaft such that a pitch of the propeller blades can be varied.

In other words, an angle which is included by the propeller blades with the plane of rotation in which the propeller blades rotate can be varied. Varying the pitch of the propeller blades in this way can preferably be carried out for all the propeller blades together. In particular, the pitch of the propeller blades can be varied irrespective of a current position of the rotating propeller blades, i.e. the propeller blades are not varied in their pitch during a revolution, as with a swash plate in the case of a helicopter, but the pitch of the propeller blades remains substantially constant during a revolution. This type of relatively slow variation in the pitch of the propeller blades can be realized simply and by means of a robust mechanism.

Varying the pitch of the propeller blades can influence the thrust of the lifting rotor and hence the lifting force generated thereby, without necessarily having to change the rotational speed of the propeller. A lifting propeller of this type provided with jointly swivellable propeller blades is also known as a variable pitch propeller.

In principle, it can suffice to fit the proposed aircraft with only three lifting rotors. In this respect, each of the lifting rotors should be separately controllable, i.e. it should be possible to vary a thrust generated by one of the lifting rotors independently of the other lifting rotors. The at least three lifting rotors are attached to the aircraft in positions which together clearly span a plane, i.e. the lifting rotors should not be arranged linearly in tandem along a common straight line. By appropriately controlling the three lifting rotors to generate different lifting forces, the plane spanned by the lifting rotors and thereby the entire aircraft can be tilted.

As long as the lifting rotors are oriented such that the sum of the thrusts which they have generated acts substantially vertically downwards, the aircraft can hover in a stationary manner and the flight altitude of the aircraft can be varied by varying the strength of this total thrust. If, starting from a hover flight of this type, the thrust generated by individual lifting rotors is changed, this can mean that the total thrust acting on the aircraft no longer acts vertically downwards. Consequently, the aircraft can tilt forwards, backwards or to one side and can gain momentum or start to roll forwards or backwards.

If the proposed aircraft is restricted to only three lifting rotors, it is possible to save components and thereby to reduce weight. However, in general it is difficult with only three lifting rotors to allow the aircraft to rotate about its vertical axis, i.e. to yaw.

Therefore, it can be advantageous to fit the proposed aircraft with at least four lifting rotors, similarly to the case of a quadcopter. The four lifting rotors can preferably be controlled independently of one another. Since the position or inclination of the aircraft can already be determined by the thrust generated by just three lifting rotors, providing an additional fourth lifting rotor presents the possibility of also allowing the aircraft to yaw. The aircraft can thus be brought into any desired position and flight direction by appropriately controlling the four lifting rotors. An aircraft of this type with four or more lifting rotors can also be maneuvered in a precise and agile manner, in addition to having good hover characteristics.

The proposed aircraft is to have a support structure and a wing structure. The support structure is to provide structural strength to the aircraft so that both the wing structure and the lifting rotors can be attached in a stable manner to the aircraft. The wing structure is to be able to provide dynamic lift by means of suitably configured aerofoils when the aircraft adopts a sufficiently high cruising speed.

It should be noted that the fact that two separate terms are used for the support structure and the wing structure does not mean that the functions to be performed by the support structure and by the wing structure do not necessarily have to be performed by separate actual structures. For example, functions of the support structure and functions of the wing structure can be performed by different structural components of the proposed aircraft or even by the same structural components of the aircraft. As an example, a wing of an aircraft can simultaneously function as an aerofoil generating a dynamic lift and thereby as part of a wing structure and it can also mechanically interconnect other components of the aircraft and can thus function as part of a support structure. For example, the wing can have an outer skin which provides a profile of an aerofoil formed thereby and is thus part of the wing structure. At the same time, the wing can have inner components such as struts which provide a mechanical strength and to which, for example, the wing skin is attached so that these can serve as a support structure.

In an advantageous embodiment, the support structure together with the wing structure is configured as a tandem wing structure. Provided in a tandem wing structure of this type is at least one elongate fuselage, from which two pairs of aerofoils arranged horizontally in tandem project transversely.

In a tandem wing structure of this type, the fuselage together with supporting structures in the projecting pairs of aerofoils can serve as a support structure. One of the lifting rotors can be respectively arranged on each of the aerofoils. If, for example, two pairs of aerofoils are provided, the first pair of aerofoils and the second pair of aerofoils can have a different sweep. If the first pair of aerofoils has a negative sweep and the second pair of aerofoils has a positive sweep, a plan view of the aircraft can give the impression of an x-shaped arrangement of the aerofoils. Furthermore, the aspect ratio can be increased by attaching wing tip extensions to the aerofoils which have already been integrated into the support structure, thereby increasing the wingspan of the wing structure or of the pairs of aerofoils. A person skilled in aircraft construction understands "aspect ratio" as meaning the ratio of the square of wingspan of both aerofoils and of the wing area which is revealed in a plan view of the aircraft.

The two pairs of aerofoils of a tandem wing structure can also be arranged, for example, offset relative to one another along the vertical axis of the aircraft, i.e. in a z direction.

It is pointed out that a plurality of elongate fuselages can also be provided as part of a support structure. For example, two elongate fuselages are arranged next to one another parallel to the direction of flight and are interconnected by at least one further aerofoil or by a further pair of aerofoils.

The lifting rotors are thus arranged distributed in a planar manner over the aircraft and can thereby provide good hover characteristics. The lifting rotors can preferably be respectively arranged in end regions of the aerofoils, i.e. laterally approximately at a maximum distance from the fuselage. Furthermore, the four aerofoils of the two pairs of aerofoils arranged in tandem can respectively provide a dynamic lift at an adequate cruising speed. The aerofoils and the lifting rotors can be configured such that they produce approximately identical lifting forces in hover flight or at a desired cruising speed. The support structure of the aircraft can be suitably configured and dimensioned to be able to absorb lifting forces of this type. Accordingly, the support structure can be optimized in respect of its strength and weight.

A nacelle, on which respectively one of the lifting rotors is arranged, can be positioned on each of the aerofoils. For example, a motor for the rotor can be accommodated in the nacelle. The nacelle can be configured to be aerodynamically efficient with regard to a rotor-generated air flow and/or with regard to an air flow while cruising.

In particular, a tail unit or rudder can be arranged on each of the aerofoils. By means of such tail units or rudders, the lift generated by the tandem wing structure can be appropriately influenced, for example during acceleration to cruising speed and as a consequence thereof during successive throttling of the lifting rotors.

In an alternative embodiment, the support structure together with the wing structure can be configured as an elongate fuselage with only two transversely projecting aerofoils, similarly to a conventional aircraft. In this respect, one of the lifting rotors can be respectively arranged on each of the aerofoils and at least one further lifting rotor, preferably two further lifting rotors can be respectively arranged on the ends of the fuselage.

In a further alternative, the support structure together with the wing structure can be configured as a flying wing structure. In such a flying wing structure, the entire support structure and the entire wing structure are formed by a single aerofoil-shaped wing with inner, mechanically stabilizing supporting components. In this respect, the wing can have a swept form in a plan view. The lifting rotors and the thrust drive can be arranged in suitable regions of this type of flying wing structure.

Furthermore, it can be advantageous particularly in the case of an aircraft which is configured with this type of flying wing structure, but also in the case of the aircraft described above with a tandem wing structure or with a structure similar to a conventional aircraft, to expand the support structure around projecting nacelles to which the lifting rotors and/or the thrust drive can be attached.

Particularly in the case of an aircraft which is configured with a tandem wing structure as described above, but also in the case of other configurations of the support structure and of the wing structure, it can be advantageous or even compulsory to configure and arrange the lifting rotors and to select the wing structure such that the sum of the thrusts which can be generated by the lifting rotors passes substantially through a center of gravity of the aircraft and a neutral point of the wing structure relative to the center of gravity of the aircraft is suitably positioned for horizontal flight. A stable hover flight can be achieved by this type of arrangement of the lifting rotors. A stable flight state can also be achieved in aerodynamic flight at cruising speed by an appropriate configuration of the wing structure.

The lifting rotors of the aircraft can be configured to stop respective propeller blades of a lifting rotor in a particular rotational position. This stopping of the propeller blades can be particularly advantageous when the aircraft moves horizontally at a high cruising speed, driven by the thrust drive, and when the aerofoils of the wing structure generate enough dynamic lift so that it is unnecessary for any further lift to be generated by the lifting rotors. In a flight situation of this type, it is advantageous to stop the propeller blades of the lifting rotors in a rotational position such that on the one hand they generate the lowest possible air resistance while cruising, and on the other hand the lowest possible forces, acting horizontally and/or vertically on the propeller blades due to the air flowing past the blades, are generated.

The propeller of a lifting rotor can have, for example, exactly two blades. Such a propeller has on the one hand a high efficiency and on the other low imbalances. Furthermore, such a propeller with two blades is particularly advantageous for the proposed aircraft because, during a cruising position, it can be stopped in a rotational position such that the propeller extends parallel to the direction of flight. The arrested propeller generates minimal air resistance in such a rotational position.

However, a single blade propeller can also be provided. On an end projecting beyond its rotor shaft, the single blade propeller has a weight which acts as a counter-weight to the single blade propeller. For example, the single blade propeller can be part of a lifting rotor of the aircraft which contributes towards the lift of the aircraft in the hover state. For the cruising state, the single blade propeller can be oriented parallel to an elongate nacelle, so that when stationary, the single blade propeller is oriented substantially parallel to the flight direction or to the longitudinal direction of the aircraft. The single blade propeller and the nacelle are then oriented in alignment with one another, which reduces the air resistance while the aircraft is cruising. In turn, the nacelle can be attached to one end of an aerofoil.

In the proposed aircraft, the lifting rotors and the thrust drive are preferably driven by motors which can be controlled independently of one another. Due to motors of this type which can be controlled separately from one another, in the aircraft, lift generated by the lifting rotors on the one hand and propulsion generated by the thrust drive on the other can be controlled independently of one another. In particular, rolling or yawing of the aircraft to be produced by the lifting rotors can be controlled independently of the horizontal propulsion to be produced by the thrust drive. In this respect, with an increasing cruising speed, the lifting rotors can also be controlled accordingly for a reduced lift generation to take into account the dynamic lift produced by the aerofoil of the wing structure.

Each of the lifting rotors can preferably be driven by an electric motor. Electric motors can be controlled precisely and quickly in respect of their rotational speed so that the lift generated by a lifting rotor can be varied quickly and precisely to initiate or control particular flight movements of the aircraft. Particularly in the case of an aircraft similar to a multicopter, the precise and rapid control of the vertical thrusts generated by the individual lifting rotors can be important for safe, stable and, if required, effortlessly maneuvered flight characteristics.

In a specific embodiment of the proposed aircraft, the thrust drive can be driven by an internal combustion engine and the internal combustion engine can also be coupled to a generator to supply electrical energy for the electric motors provided on the lifting rotors. In the case of such an aircraft provided with a type of hybrid drive, the thrust acting in the horizontal direction can be produced by the internal combustion engine of the thrust drive. The internal combustion engine can be realized as a piston motor or as a jet engine or the like. Fuel for an internal combustion engine of this type can be carried in the aircraft in adequate quantities so that the thrust drive can be operated for relatively long periods of time and the aircraft can thus fly at cruising speed for a lengthy period of time, for example in order to reach a remote target. However, unlike the thrust drive, the lifting rotors are preferably driven by electric motors in order to be able to use the simpler and more precise controllability compared to an internal combustion engine during hover flight or during take-off or landing. The electrical energy for these electric motors can be provided by the generator coupled to the internal combustion engine, it being possible for the electrical energy to either be supplied directly by the generator to the electric motors or to be firstly stored in an electrical energy storage, such as in a battery, to then be released by the electric motors when required.

It is pointed out that possible features and advantages of the aircraft according to the invention are described herein with reference to different embodiments. A person skilled in the art will understand that the different features can be suitably combined or interchanged in order to arrive at further embodiments of the aircraft according to the invention.

In an alternative embodiment, the aircraft can have at least one aerofoil which is attached to the support structure such that it can swivel or rotate about a rotational axis. The rotational axis is oriented, for example, parallel to the vertical axis or to the yaw axis of the aircraft.

In an alternative embodiment, the aircraft has a second aerofoil which is attached to the support structure such that it can swivel about the rotational axis, the at least one aerofoil and the second aerofoil being in a swivelled-out state for hover flight.

Furthermore, the at least one aerofoil and the second aerofoil can be in a swivelled-in state for cruising, in which state leading edges of the aerofoils are oriented such that they are at least partly aligned with one another.

The support structure together with the wing structure can also be configured as a tandem wing structure with an elongate fuselage and two pairs of aerofoils which are arranged horizontally in tandem and project from the fuselage such that the first pair of aerofoils has a first sweep which differs from a second sweep of the second pair of aerofoils. In this respect, the sweep defines an angle between a transverse axis of the aircraft and the leading edge of the aerofoils.

In an alternative embodiment of the aircraft, the first pair of aerofoils and the second pair of aerofoils are connected by at least one connecting structure. The at least one connecting structure has an elongate form and is oriented parallel to the elongate fuselage. Furthermore, the at least one connecting structure can have a tail unit.

In an alternative embodiment, the first pair of aerofoils and the second pair of aerofoils are arranged vertically offset from one another. The vertical direction describes an axis parallel to the vertical axis or yaw axis of the aircraft and is oriented vertically, for example, to the transverse axis and to a longitudinal direction of the aircraft.

In a further alternative embodiment, the propellers of the lifting rotors are configured as single-blade propellers.

BRIEF DESCRIPTION OF THE DRAWINGS

In the following, embodiments of the present invention are described with reference to the accompanying drawings, although neither the drawings nor the description are to be construed as limiting the scope of the invention.

The figures are merely schematic and are not true to scale. Identical reference signs in the figures identify identical or identically functioning features.

DESCRIPTION OF ADVANTAGEOUS EMBODIMENTS OF THE INVENTION

Figure 1:
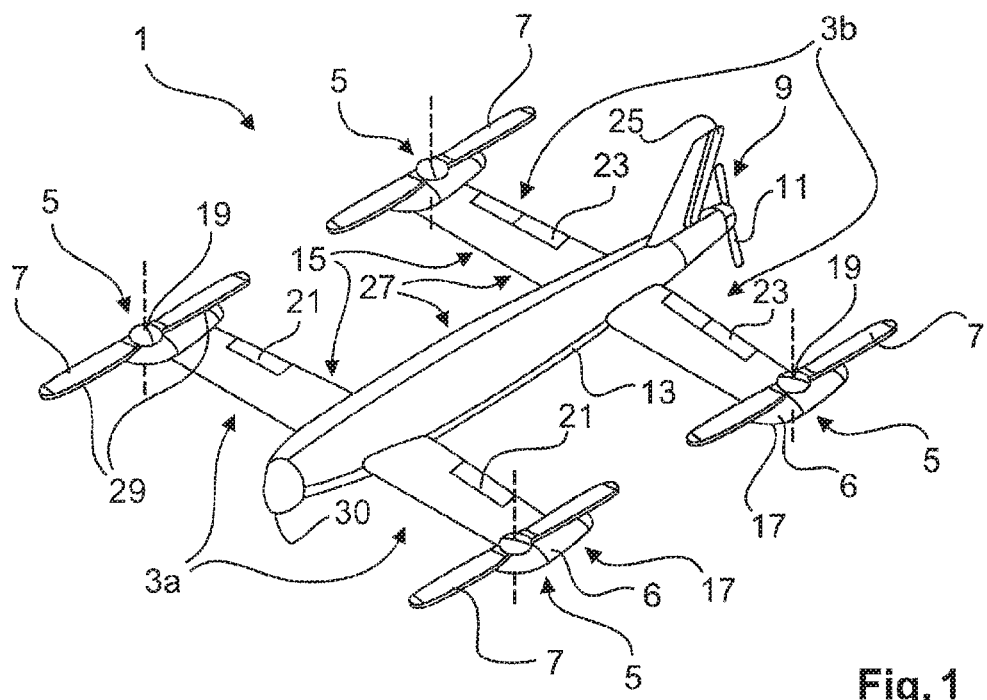
FIG. 1 is a perspective view of an aircraft according to the invention with a tandem wing structure.
Figure 2:
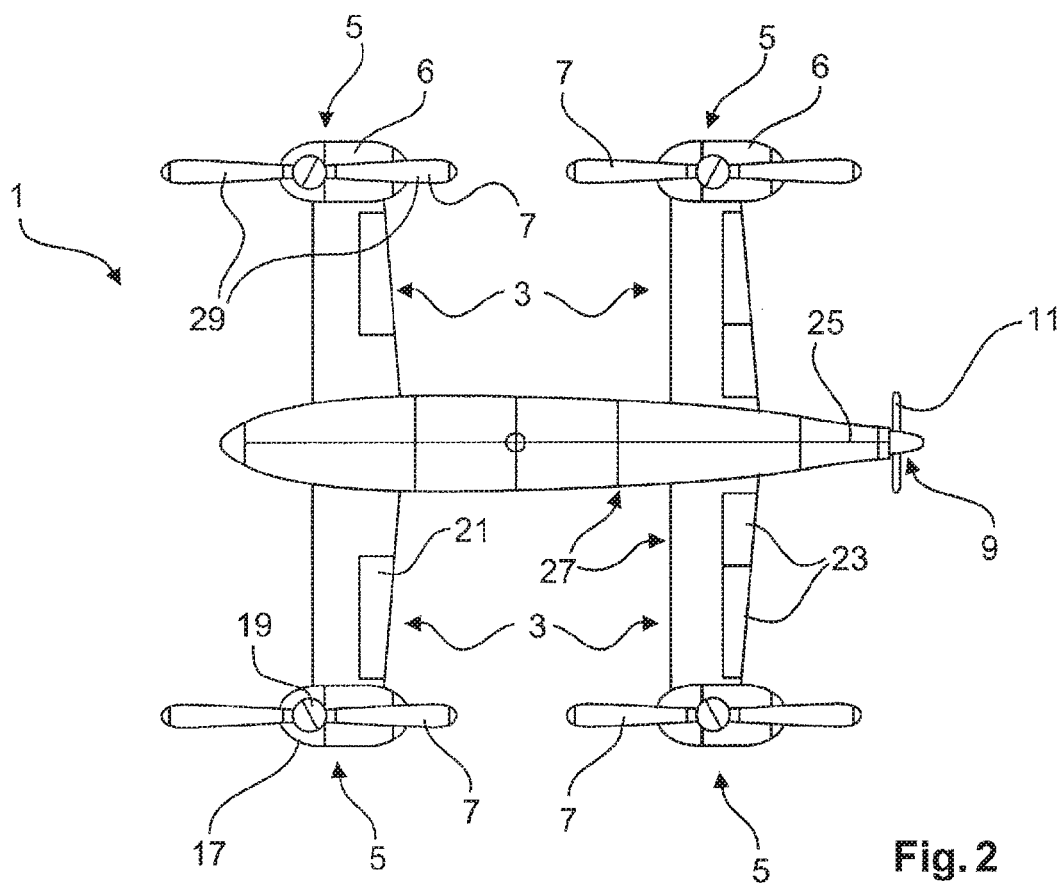
FIG. 2 is a plan view of the aircraft from FIG. 1.

FIGS. 1 and 2 are a perspective view and a plan view of an aircraft 1 according to an embodiment of the present invention.

In the embodiment shown, the aircraft 1 has a tandem wing structure and, similarly to a quadcopter, one of four lifting rotors 5, fitted with a propeller 7, is arranged at both ends of each of the aerofoils 3. The lifting rotors are arranged on nacelles 6 at the ends of the aerofoils 3.

The aircraft 1 has a support structure 27 and a wing structure 15.

The support structure 27 provides the aircraft 1 with the necessary mechanical strength, for example, to transfer forces generated by the lifting rotors 5 or by the aerofoils 3 between individual regions of the aircraft 1. For this purpose, the support structure 27 has, for example, struts, stringers and formers which can form, inter alia, an elongate fuselage 13 as well as supporting parts of the aerofoils 3. The support structure can also be used to hold a camera system 30, for example, The wing structure 15 forms, inter alia, the plurality of aerofoils 3 of the aircraft. Each of the aerofoils 3 of the wing structure 15 has a suitable profile to generate a lifting force onto the aircraft 1 by dynamic lift during horizontal motion of the aircraft 1.

In the example shown in FIGS. 1 and 2, the support structure 27 together with the wing structure 15 is formed as a tandem wing structure in which an elongate fuselage 13 is provided having two pairs of aerofoils 3 which are arranged horizontally in tandem and project transversely at the sides, approximately at a right angle from the fuselage 13.

The aerofoils 3 of the wing structure 15 are configured and attached to the fuselage 13 in suitable positions such that a neutral point of the wing structure 15 relative to a centre of gravity of the aircraft 1 is in a suitable position for horizontal flight of the aircraft 1. A neutral point of an aerofoil profile or of a wing structure having a plurality of aerofoil profiles can be understood as meaning a fixed point with constant torque in the region of moderate angles of incidence.

Tail units 21, 23 in the form of flaps or rudders which can be used as elevators or horizontal tails at high cruising speeds in the horizontal direction similarly to a conventional aircraft can also be provided both on the aerofoils of a front pair of aerofoils 3a and on the aerofoils of a rear pair of aerofoils 3b. Furthermore, a rudder unit or rudder 25 can be provided on the tail of the fuselage 13.

Provided at the ends or end regions of each of the aerofoils 3a, 3b is a respective lifting rotor 5 on a nacelle 6 so that the total of four lifting rotors 5 are arranged in a common plane and at the four corners of a virtual square.

Each of the lifting rotors 5 has a propeller 7 which can be driven in rotation by a rotor shaft 19 and a motor. The propeller 7 can be a rigid, preferably integral propeller so that a lift generated by the lifting rotor 5 can merely be varied by varying the rotational speed of the propeller 7. Alternatively, the propeller 7 can be a variable pitch propeller in which propeller blades 29 can be varied in pitch and, in this manner, lift generated by the lifting rotor 5 can be varied even at a constant rotational speed.

Figure 3:
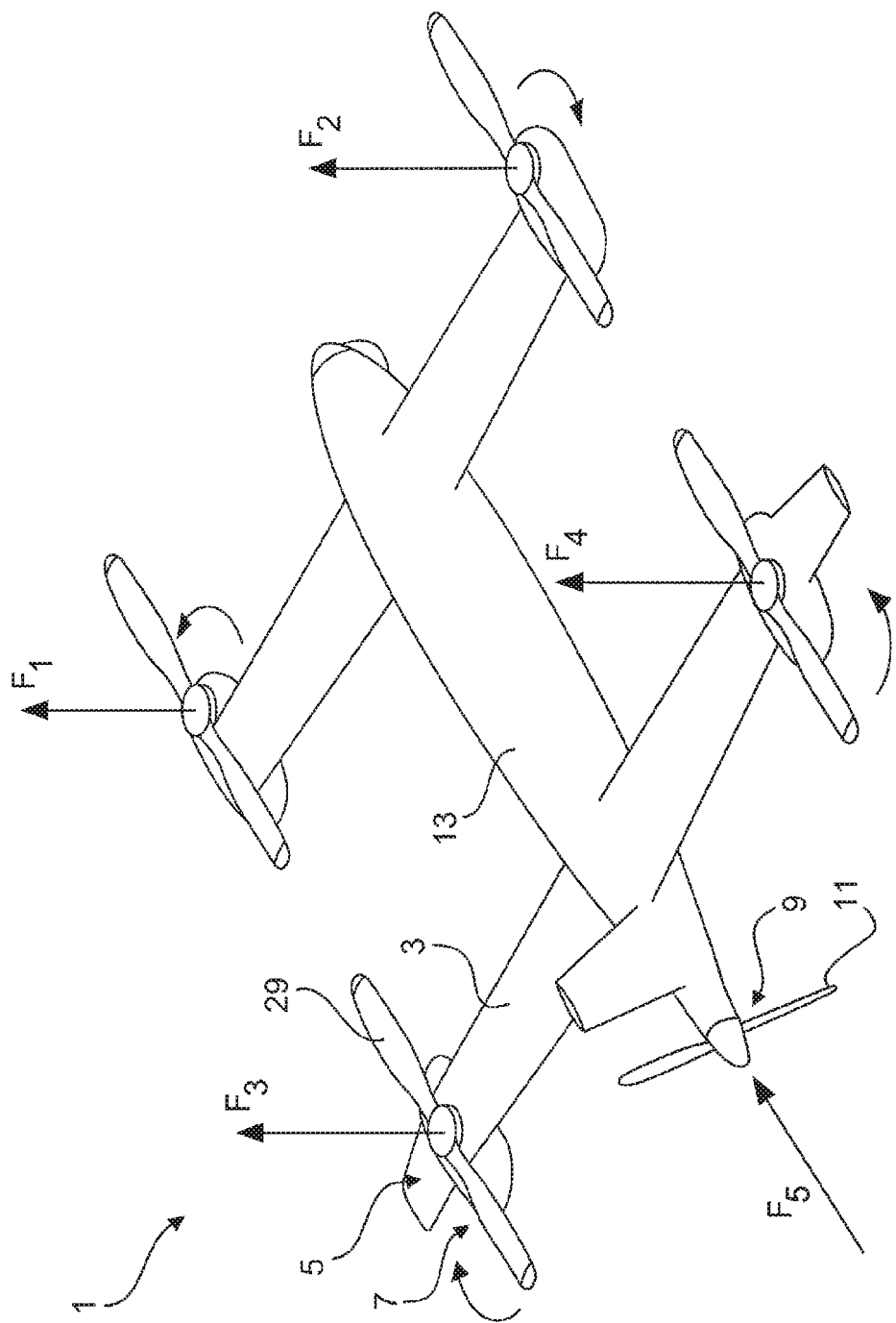
FIG. 3 is a perspective view of an aircraft according to the invention with forces acting thereon.

As shown in FIG. 3, each of the lifting rotors 5 is configured to generate a lifting force F1, F2, F3, F4. In this respect, the lifting rotors 5 should be positioned and oriented on the aircraft 1 such that the sum of the lifting forces generated thereby passes approximately through a center of gravity of the aircraft 1, particularly when all the lifting rotors 5 are operated uniformly at the same time. The thrust which can be generated overall by the lifting rotors 5 should be sufficient to lift the aircraft 1 and to allow it to hover. Some of the lifting rotors 5 rotate in opposite directions, as indicated by arrows in FIG. 3, so that the moments generated by the lifting rotors 5 substantially cancel each other out.

By varying the lifting forces F1, F2, F3, F4 generated by the individual lifting rotors 5, it is possible to vary the magnitude and direction of the total thrust which is generated overall and which acts on the aircraft 1, and in this manner the aircraft 1 can ascend or descend, can tilt forwards and backwards or to one side, or can rotate about a vertical axis of the aircraft, thereby making it possible to produce flight movements such as forwards flight, rolling and/or yawing.

Thus it is possible in principle with the proposed aircraft 1, similarly to a quadcopter, for all flight movements to be realized by appropriately controlling the various lifting rotors 5. However, an achievable cruising speed at which the aircraft 1 can move horizontally is restricted here due to physical effects.

Therefore, to achieve high cruising speeds, the proposed aircraft 1 is additionally fitted with a thrust drive 9, by which a thrust F5 acting in the horizontal direction (see FIG. 3) can be produced.

In the example shown, the thrust drive 9 is formed by a thrust propeller 11, driven by an additional motor, and is arranged on the tail of the fuselage 13. However, the thrust drive 9 can also use other drive mechanisms, such as a jet engine. The thrust drive 9 should be adequately configured, i.e. it should allow adequate output power to enable the aircraft 1 to accelerate to high cruising speeds of, for example, up to 800 km/h.

In the aircraft 1 which has been accelerated by the thrust drive 9, an increasing dynamic lift is generated on the profiled aerofoils 3 as the cruising speed increases. This dynamic lift helps to hold the aircraft 1 in the air so that the lifting forces F1, F2, F3, F4 generated by the lifting rotors 5 can be successively reduced until the aircraft 1 has reached an adequately high cruising speed in the horizontal direction at which the total lift for the aircraft required to maintain the flight altitude is generated by the aerofoils 3.

The lifting rotors 5 can be stopped at such a cruising speed. It is provided in particular to stop the propellers 7 of the lifting rotors 5 in a position in which they generate the lowest possible air resistance and in which the lowest possible forces act on a propeller 7.

In the example shown, the propellers 7 are fitted merely with two blades 29 for this purpose, so that the linearly extending propeller 7 can be oriented with its blades 29 in the flight direction while cruising and can be stopped in this orientation. Alternatively, it would also be conceivable to retract the propeller 7 while cruising or, while cruising, to lower the propeller 7 or the entire lifting rotor 5, for example into a nacelle 17 provided on a respective end of an aerofoil to reduce the flow resistance.

Figure 4:
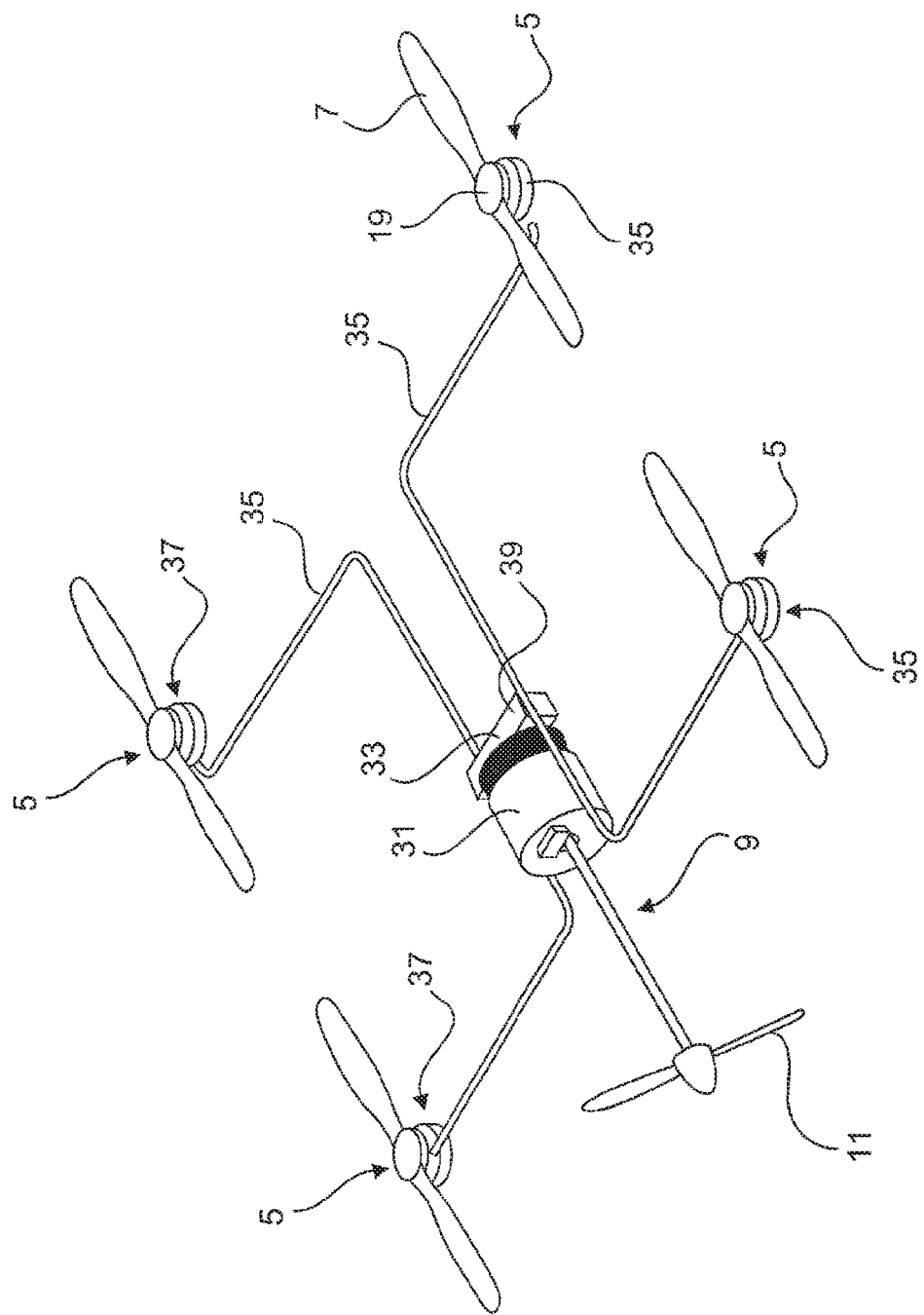
FIG. 4 shows a possible configuration of drives for an aircraft according to the invention.

FIG. 4 shows a possibility of an advantageous hybrid drive system for an aircraft 1 according to the invention.

Here, a main motor 31 is used to drive a thrust propeller 11. Thus, together with the thrust propeller 11, the main motor 31 forms the thrust drive 9 to generate the thrust F5 acting horizontally on the aircraft. The main motor 31 can be any type of motor capable of allowing sufficient power for horizontal flight at desired high cruising speeds. For example, the main motor 31 can be a diesel engine, a petrol engine, a Wankel engine, a gas turbine, a fuel cell-powered electric motor, etc.

In addition to the thrust propeller 11, the main motor 31 also drives an electrical generator 33. The generator 33 converts the mechanical drive energy provided by the main motor 31 into electrical energy and supplies this via lines 35 to a plurality of electric motors 37. The electric motors 37 are part of the lifting rotors 5, provided on the ends of the aerofoils, of the quadrocopter-like aircraft 1. The electric motors 37 can respectively drive the propeller 7 attached thereto via a rotor shaft 19. The torque acting on the propeller 7 and thus the rotational speed assumed by the propeller 7 can be varied very precisely and quickly by the electric motor 37. To be able to electrically power and control the four electric motors 37, an electronic power control 39 is provided in the generator 33.

As an alternative to the hybrid drive system described above, the proposed aircraft 1 can also be operated by other drive systems. For example, the lifting rotors 5 can also be driven by internal combustion engines. Alternatively, it is possible to provide a central motor for the entire drive system and the plurality of lifting rotors can be coupled to this motor by power transmission shafts, it being optionally possible for couplings and/or gears to be provided in the associated drive trains. A lift to be generated by a lifting rotor 5 can be varied by changing the rotational speed and/or by changing an adjustable pitch of the propeller blades of the lifting rotor. Each of the lifting rotors 5 can also be driven by a separate electric motor, it being possible for the electric motors themselves to be driven by a main motor.

The described drive possibilities, such as the hybrid drive system, can be combined with all the embodiments described above and below. This is possible because in the described embodiments, at least one thrust drive 9 and at least three lifting rotors 5 are always provided.

Figure 5:
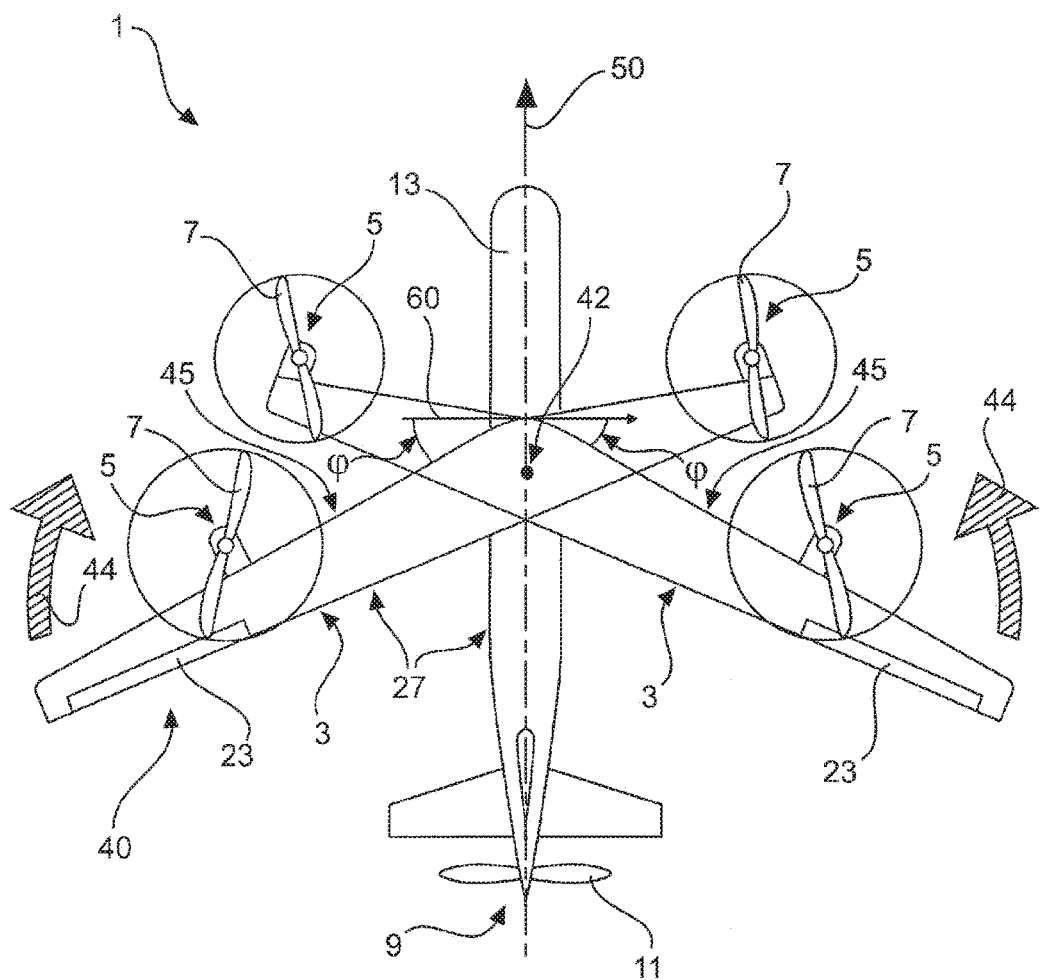
FIG. 5 is a plan view of an aircraft according to the invention with two aerofoils in a swivelled-out state.

FIG. 5 is a plan view of the aircraft 1 with a support structure 27 which has two aerofoils 3 which are swivellable relative to one another. In the configuration shown, the aircraft 1 is in a hover flight state 40 in which the aerofoils 3 are in a swivelled-out state. The aerofoils 3 are mounted such that they can swivel or rotate about a rotational axis 42. The rotational axis 42 is arranged, for example, parallel to the vertical axis and/or yaw axis of the aircraft 1 and passes through the elongate fuselage 13 of the aircraft 1. In a plan view, the aerofoils 3 respectively project beyond the elongate fuselage 13 so that the two aerofoils 3 intersect in the region of the rotational axis 42. In other words, the left aerofoil extends beyond the elongate fuselage 13 on the right-hand side of the aircraft 1 and the right aerofoil extends beyond the elongate fuselage 13 on the left-hand side of the aircraft 1. In this respect, it is to be borne in mind that the left aerofoil of the fuselage 13 means the aerofoil positioned on the left-hand side in the direction of flight, the direction of flight describing the horizontal direction in which the thrust of the thrust drive 9 acts with the thrust propeller 11. Analogously, the right aerofoil of the fuselage 13 means the aerofoil positioned on the right-hand side in the direction of flight. The part of the left aerofoil projecting on the right-hand side of the fuselage 13 can be smaller in terms of area than the part of the left aerofoil located on the left-hand side of the fuselage 13. Analogously, the part of the right aerofoil projecting on the left-hand side of the fuselage 13 can be smaller in terms of area than the part of the right aerofoil located on the right-hand side of the fuselage 13.

A wing leading edge 45 or aerofoil leading edge can be arranged inclined at a predetermined sweep angle $\varphi$ to a transverse axis 60 of the elongate fuselage 13. A person skilled in aircraft construction understands a transverse axis 60 as meaning an axis oriented vertically to the longitudinal direction 50 of the fuselage 13 and to the vertical axis of the aircraft. The sweep angle $\varphi$ is measured, for example, between the transverse axis 60 of the fuselage 13 and the leading edge 45 of the aerofoil 3. The sweep of the aerofoils 3 or the sweep angle $\varphi$ can be adapted, for example, to the flight speed of the aircraft 1 during horizontal flight. For this purpose, during the transition from a hover flight state 40 to a cruising state, which will be described in detail below, the sweep angle $\varphi$ can be continuously reduced. The arrows 44 show the movement of the aerofoils 3 during the transition from a hover flight state 40 into the cruising state, i.e. from the swivelled-out state into a swivelled-in state. A locking of the aerofoils 3 in a particular sweep can be provided by an appropriate locking device for the aerofoils 3. The transverse direction 60 of the elongate fuselage 13 can be oriented vertically to the rotational axis 42 and/or vertically to the horizontal direction. The horizontal direction is, for example, parallel to the longitudinal direction 50 of the elongate fuselage 13 of the aircraft 1. The swivellable aerofoils each have two lifting rotors 5, each of the lifting rotors 5 having a propeller 7. In the swivelled-out state, the lifting rotors 5 are positioned and oriented on the aircraft 1 such that the sum of the lifting forces generated thereby passes approximately through the center of gravity of the aircraft 1, particularly when all the lifting rotors 5 are operated uniformly at the same time. This allows a hover flight state 40 in which the aircraft 1 does not move, or moves only slightly, in the horizontal direction. For example, a lifting rotor 5 of the left aerofoil is fitted on the left-hand side of the fuselage 13 and a further lifting rotor 5 is fitted on the part of the left aerofoil projecting on the right-hand side of the fuselage 13. Analogously, a lifting rotor 5 of the right aerofoil is fitted on the right-hand side of the fuselage 13 and a further lifting rotor 5 is fitted on the part of the right aerofoil projecting on the left-hand side of the fuselage 13. During the transition from the hover flight state 40 to the cruising state, the rotational speed of the propellers 7 of the lifting rotors 5 can be continuously decelerated so that they are finally stationary in the cruising state.

Figure 6:
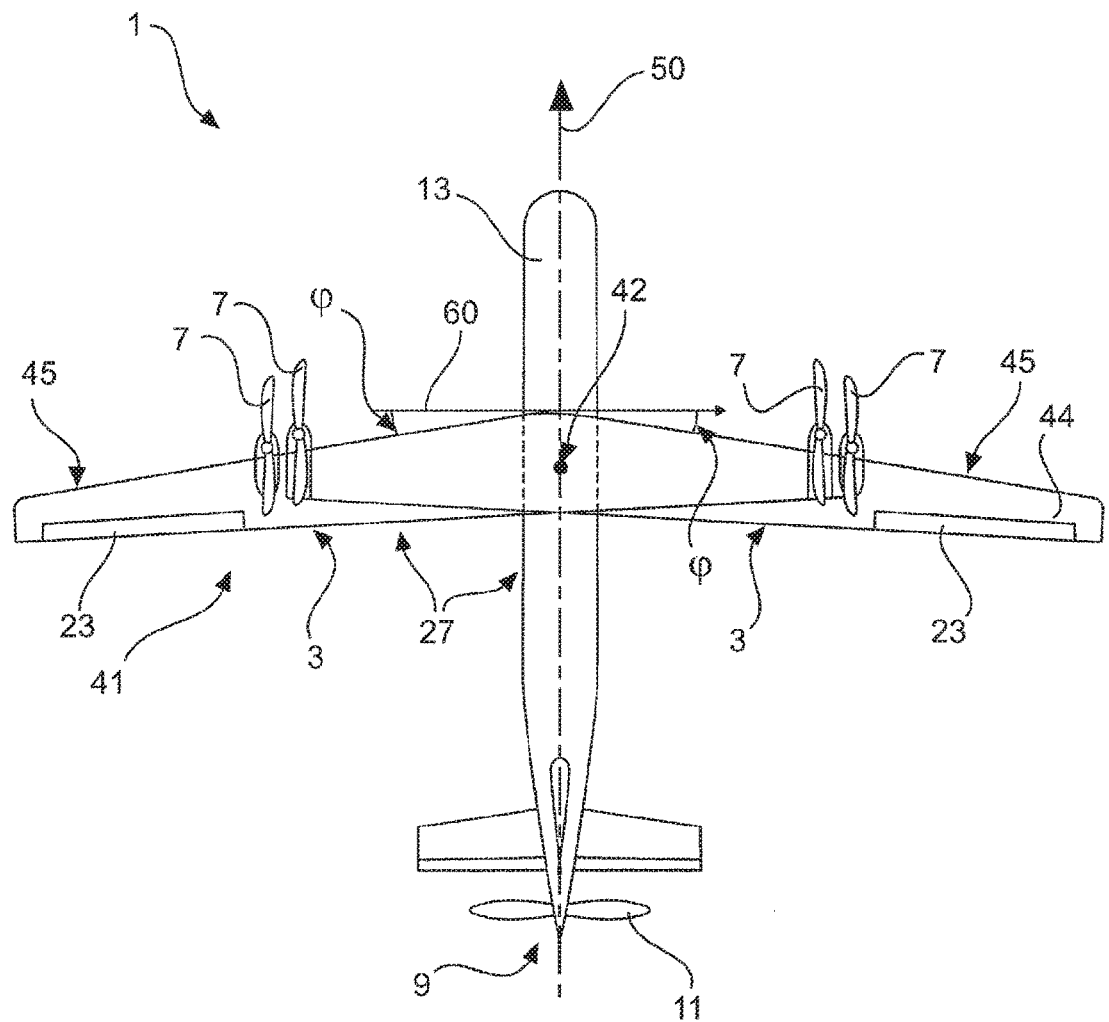
FIG. 6 is a plan view of an aircraft according to the invention with two aerofoils in a swivelled-in state.

FIG. 6 is a plan view of the aircraft 1 with a support structure 27 which has two aerofoils 3 which are swivellable relative to one another. In the configuration shown, the aircraft 1 is in the cruising state 41 in which the aerofoils 3 are in a swivelled-in state. In the cruising state 41, the sweep angle φ is smaller than in the hover flight state 40. In the swivelled-in state, the leading edge 45 of the left aerofoil can be oriented to align with the leading edge of the part of the right aerofoil projecting over the fuselage 13. Analogously, in the swivelled-in state, the leading edge 45 of the right aerofoil can be oriented to align with the leading edge of the part of the left aerofoil projecting over the fuselage 13. In the swivelled-in state, the propellers 7 of the lifting rotors 5 are stationary and are oriented such that, in the cruising state 41, they generate the lowest possible air resistance. For example, the elongate propellers 7 are then oriented in their longitudinal direction parallel to the horizontal direction or longitudinal direction 50 of the fuselage 13.

The sweep angle φ of the aerofoils 3 can be between 0 degrees and 90 degrees both in the swivelled-out state and in the swivelled-in state. A positive sweep is defined by a sweep angle φ of more than 0 degrees. A negative sweep is defined by a sweep angle φ of less than 0 degrees. If the sweep angle φ is equal to 0 degrees, there is no sweep. In the aircraft 1 according to the invention, both positive and negative sweeps of the aerofoils 3 are possible. The aerofoils 3 can also be unswept. A positive sweep and a negative sweep can be provided in all embodiments described above and below.

Figure 7:
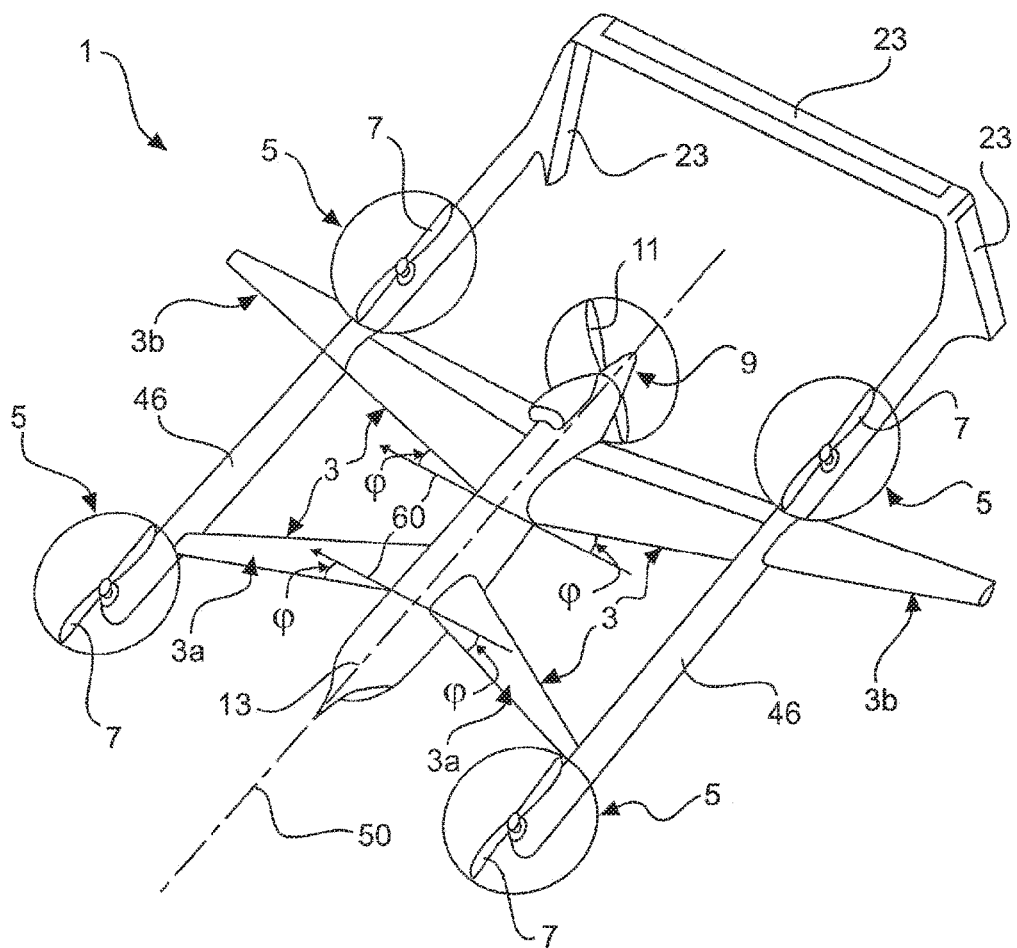
FIG. 7 is a perspective view of an aircraft according to the invention with a tandem wing structure in which the aerofoils are swept.

FIG. 7 is a perspective view of the aircraft 1 with a tandem wing structure. In this respect, the elongate fuselage 13 and two pairs of aerofoils 3, arranged horizontally in tandem and projecting from the fuselage 13, are formed. The first pair of aerofoils 3a has a negative sweep with a sweep angle φ of between 0 and −90 degrees and the second pair of aerofoils 3b has a positive sweep with a sweep angle φ of between 0 and 90 degrees. In the embodiment shown, the first pair of aerofoils 3a is arranged in front of the second pair of aerofoils 3b, bearing in mind the flight direction, so that a plan view of the aircraft 1 gives the impression of an x-shaped arrangement of the first pair of aerofoils 3a and of the second pair of aerofoils 3b. The first pair of aerofoils 3a and the second pair of aerofoils 3b are interconnected by connecting structures 46. In this respect, the right aerofoil of the first pair of aerofoils 3a is connected to the right aerofoil of the second pair of aerofoils 3b by a connecting structure 46. Analogously, the left aerofoil of the first pair of aerofoils 3a is connected to the left aerofoil of the second pair of aerofoils 3b by a further connecting structure 46. Thus, two connecting structures 46 are preferably provided, but it is possible to provide any number of connecting structures 46. One connecting structure 46 can be attached, for example, to one end of the left aerofoil of the first pair of aerofoils 3a and another connecting structure 46 can be attached, for example, to one end of the right aerofoil of the first pair of aerofoils 3a. The connecting structures 46 can have an elongate form and can be oriented parallel to the longitudinal direction 50 of the fuselage 13. The connecting structures 46 can also be interconnected by a tail unit 23. The tail unit 23 is, for example, a rudder unit or a horizontal tail or a combination of rudder unit and horizontal tail. The connecting structures 46 can be arranged such that the aerofoils of the second pair of aerofoils 3b intersect the connecting structures 46 and the aerofoils of the first pair of aerofoils 3a end in the connecting structures 46. Furthermore, the connecting structures 46 can have lifting rotors 5 with propellers 7. In this case, two lifting rotors 5 are attached in each case to both connecting structures 46. The lifting rotors 5 are positioned and oriented on the aircraft 1 such that the sum of the lifting forces generated thereby passes approximately through the center of gravity of the aircraft 1, particularly when all the lifting rotors 5 are operated uniformly at the same time. A respective lifting rotor 5 is attached to the connecting structures 46 in the region of the first pair of aerofoils 3a and a respective lifting rotor 5 is attached to the connecting structures 46 in the region of the second pair of aerofoils 3b. Due to the arrangement of the lifting rotors 5, the aircraft 1 can be brought into a hover flight state 40. Bearing in mind the flight direction of the aircraft 1, the connecting structures 46 can project to beyond the thrust drive 9 fitted to the fuselage 13, where the two connecting structures 46 are interconnected by the tail unit 23. Thus, the connecting structures 46 oriented in the longitudinal direction 50 are interconnected by the first pair of aerofoils 3a, by the second pair of aerofoils 3b and by the tail unit 23. The connecting structures 46 thus have no direct contact with the fuselage 13, but are connected thereto via the pairs of aerofoils.

Figure 8:
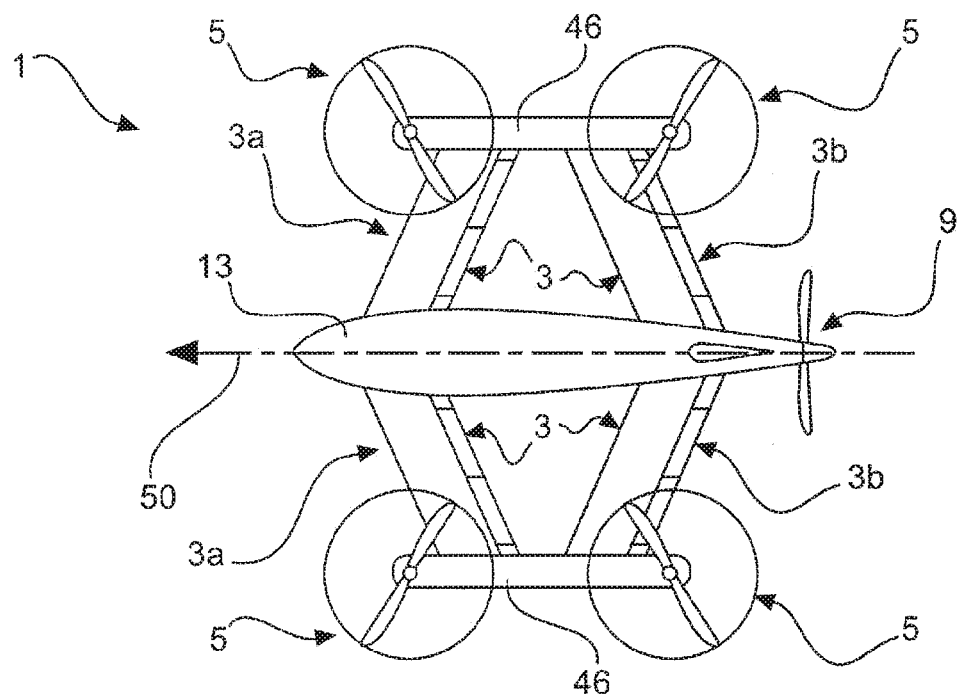
FIG. 8 is a plan view of an aircraft according to the invention with a further tandem wing structure in which the aerofoils are swept.

FIG. 8 is a plan view of a configuration of the aircraft 1 in which the first pair of aerofoils 3a is arranged in front of the second pair of aerofoils 3b, bearing in mind the flight direction. The first pair of aerofoils 3a has a positive sweep and the second pair of aerofoils 3b has a negative sweep, so that the plan view gives the impression of an o-shaped arrangement of the first pair of aerofoils 3a and of the second pair of aerofoils 3b when the ends of each of the aerofoils are interconnected by connecting structures 46. Thus, all the aerofoils 3 are connected at their ends to connecting structures 46, so that two connecting structures 46 are oriented parallel to the longitudinal direction 50 of the fuselage 13. A first connecting structure 46 connects the right aerofoils of the first pair and of the second pair of aerofoils 3a, 3b, and a second connecting structure 46 connects the left aerofoils of the first pair and of the second pair of aerofoils 3a, 3b. The aerofoils can also each have tail units 23 and/or high lift systems, such as landing flaps. The two connecting structures can each have two ends on which a respective lifting rotor 5 is arranged. The four lifting rotors 5 are positioned and oriented on the aircraft 1 such that the sum of the lifting forces generated thereby passes approximately through the center of gravity of the aircraft 1, particularly when all the lifting rotors 5 are operated uniformly at the same time, so that a hover flight state 40 of the aircraft 1 is possible.

Figure 9:
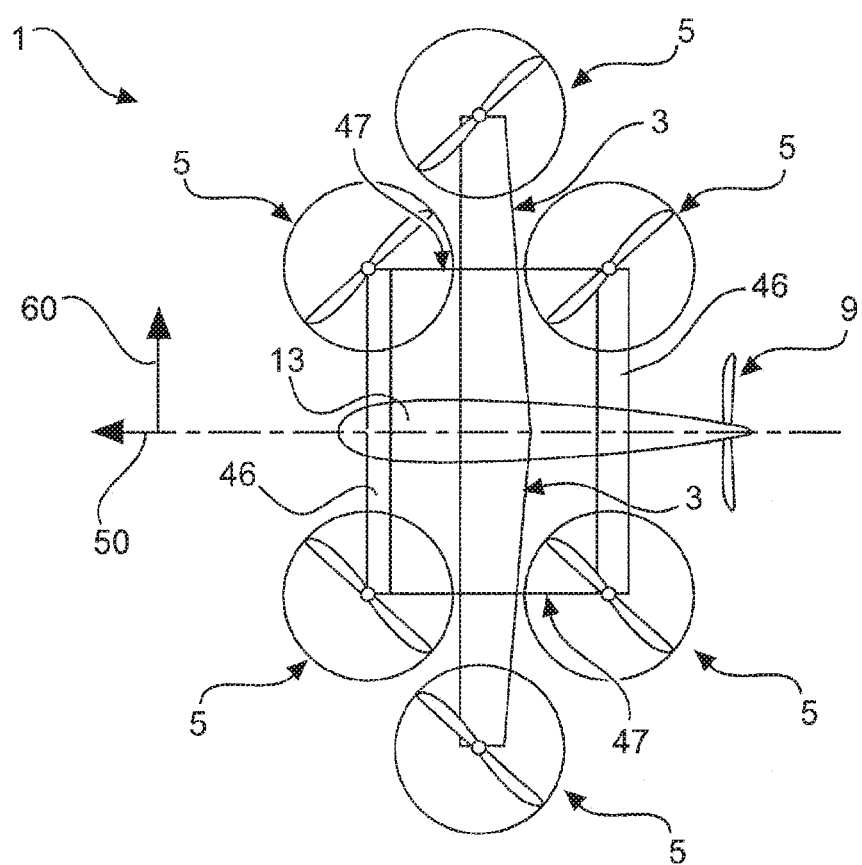
FIG. 9 is a plan view of an aircraft according to the invention with six lifting rotors.

FIG. 9 is a plan view of a configuration of the aircraft 1 with six lifting rotors 5. For this purpose, the aircraft has one pair of aerofoils 3 and two connecting structures 46, the connecting structures 46 being oriented parallel to the transverse axis 60 of the aircraft. Based on the flight direction of the aircraft 1, the connecting structures 46 are arranged offset relative to one another so that one connecting structure 46 is arranged in front of the aerofoils 3 and one connecting structure 46 is arranged behind the aerofoils 3. The connecting structures 46 can be provided, for example, with a profile which generates dynamic lift, so that the transverse arrangement of the connecting structures 46 provides the advantage of generating a lift by the connecting structures 46 in addition to the aerofoils 3. The lifting rotors 5 are attached to the respective ends of the connecting structures 46 and aerofoils 3 oriented parallel to the transverse axis 60. The six lifting rotors 5 are positioned and oriented such that the sum of the lifting forces generated thereby passes approximately through the center of gravity of the aircraft 1, particularly when all the lifting rotors 5 are operated uniformly at the same time. As a result, the aircraft 1 can hover 40. A thrust drive 9 can be provided on the tail for the propulsion of the aircraft 1 in the cruising state 41. It can also be provided that the two connecting structures 46 are interconnected at their ends in each case by two further connecting elements 47, in which case the two further connecting elements 47 are oriented parallel to the longitudinal axis 50 of the elongate fuselage 13 and vertically to the two connecting structures 46.

Figure 10:
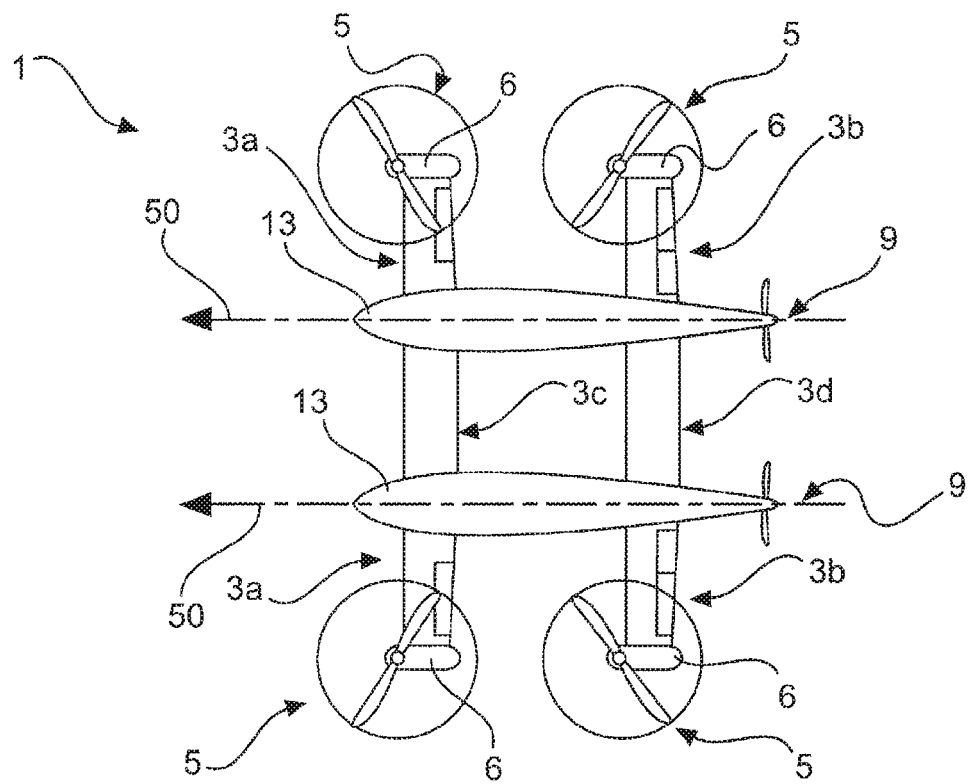
FIG. 10 is a plan view of an aircraft according to the invention with two mutually parallel elongate fuselages and two pairs of aerofoils on which lifting rotors are fitted.

FIG. 10 is a plan view of an aircraft 1 which has a support structure 27 with two mutually parallel elongate fuselages 13 and two pairs of aerofoils 3a, 3b, at the ends of which is attached a respective nacelle 6 with a respective lifting rotor 5. The required lift can be generated by the lifting rotors 5 in a hover flight state 40. The first pair of aerofoils 3a is arranged in front of the second pair of aerofoils 3b, bearing in mind the flight direction of the aircraft 1. Furthermore, provided between the two fuselages 13 are two aerofoils 3c, 3d which are arranged offset relative to one another in the flight direction and which interconnect the two fuselages 13. Like the two pairs of aerofoils 3a, 3b, the aerofoils 3c, 3d arranged between the fuselage 13 can have a profile which generates a dynamic lift. All the aerofoils of the aircraft 1 can be unswept in this case, i.e. they do not have a sweep. A thrust drive 9 for generating the propulsion of the aircraft 1 in the cruising state 41 can be attached to each of the two elongate fuselages 13 in the rear region of the fuselage 13, i.e. on the tail, based on the flight direction. This means that one thrust drive 9 can be provided on the tail on each of the two fuselages 13, so that the configuration shown here has two thrust drives 9. High lift systems, for example landing flaps, can be provided on both pairs of aerofoils 3a, 3b.

Figure 11:
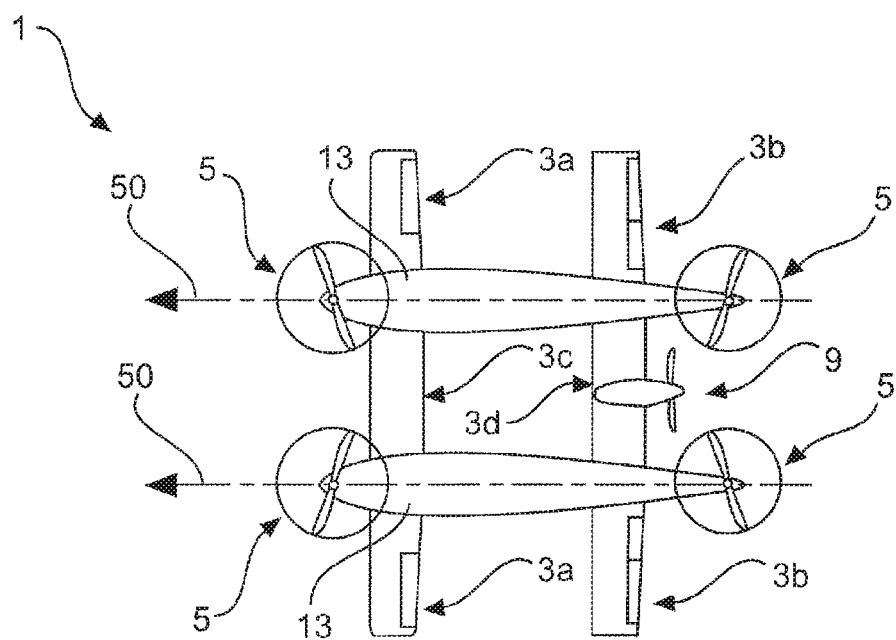
FIG. 11 is a plan view of an aircraft according to the invention with two pairs of aerofoils and two mutually parallel elongate fuselages on which lifting rotors are fitted.

FIG. 11 is a plan view of an aircraft 1 which has a support structure 27 with two mutually parallel elongate fuselages 13 and two pairs of aerofoils 3a, 3b. Furthermore, two aerofoils 3c, 3d, arranged offset relative to one another in the flight direction are provided between the two fuselages 13 and they interconnect the two fuselages 13. Like the two pairs of aerofoils 3a, 3b, the aerofoils 3c, 3d arranged between the fuselage 13 can also have a profile which generates a dynamic lift. Each of the two elongate fuselages 13 has two lifting rotors 5 arranged offset to one another along the longitudinal axis 50 of a fuselage 13. For example, a respective lifting rotor 5 is attached to each end of the elongate fuselage 13. Thus, overall, four lifting rotors 5 can be provided on the aircraft 1 which generate lift in a hover flight state 40. It is possible to provide on one of the two aerofoils 3c, 3d arranged between the fuselage 13 a thrust drive 9 which generates a thrust in the cruising state. The thrust drive 9 is preferably arranged in the rear region, based on the flight direction, i.e. between the two tails of the fuselages 13 of the aircraft 1 on aerofoil 3d. In this respect, the thrust drive 9 is arranged centrally between the two fuselages 13 to transfer the propulsion as uniformly as possible onto the aircraft 1.

Figure 12:
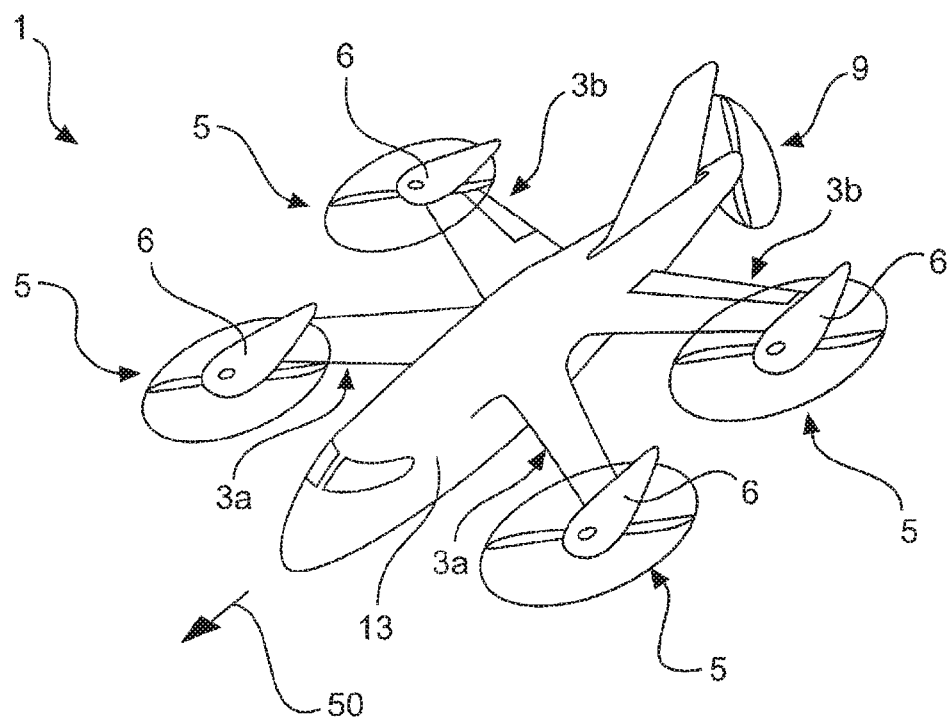
FIG. 12 is a perspective view of an aircraft according to the invention with a support structure which has two pairs of aerofoils with different sweeps.
Figure 13:
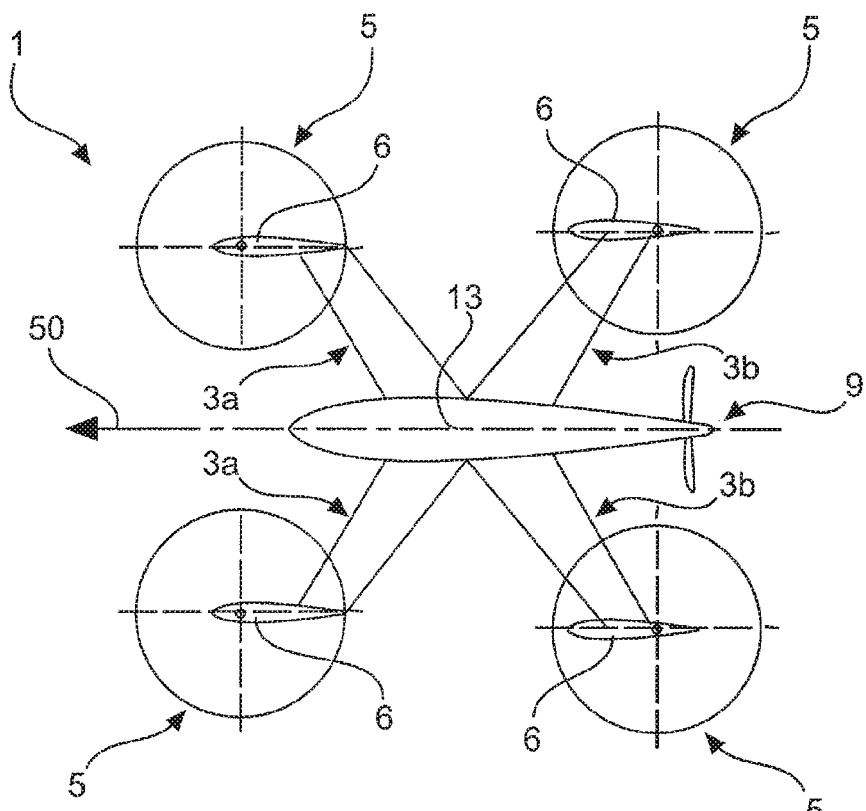
FIG. 13 is a plan view of an aircraft according to the invention with a support structure which has two pairs of aerofoils with different sweeps.

FIG. 12 is a perspective view of an aircraft 1 with a support structure 27 which has two pairs of aerofoils 3a, 3b, each of the two pairs of aerofoils 3a, 3b having a different sweep. The front pair of aerofoils 3a, based on the flight direction, has a negative sweep and the rear pair of aerofoils 3b has a positive sweep so that a plan view, as in FIG. 13, gives the impression of an x-shaped arrangement of the aerofoils 3a, 3b. However, it is pointed out that the two pairs of aerofoils 3a, 3b do not necessarily have to have the same wingspan or aspect ratio. For example, the rear pair of aerofoils 3b has a greater wingspan than the front pair of aerofoils 3a to thus achieve a higher aerodynamic efficiency. Likewise, the wing area of the rear pair of aerofoils 3b can be greater than that of the front pair of aerofoils 3a and vice versa. A nacelle 6 with a respective lifting rotor 5 can be attached to the ends of each aerofoil 3a, 3b so that when all the lifting rotors 5 are operated uniformly at the same time, the lifting forces generated thereby pass approximately through the center of gravity of the aircraft 1. However, the nacelles 6 with the lifting rotors 5 do not necessarily have to be arranged at the ends of the pairs of aerofoils 3a, 3b. They can be provided in any position on or under the pairs of aerofoils 3a, 3b, for example also in the vicinity of the fuselage. Furthermore, the support structure 27 has an elongate fuselage 13 to which the two pairs of aerofoils 3a, 3b are attached so that the lift required for a hover flight state 40 can be generated. A thrust drive 9 is attached in the tail region of the aircraft 1 to generate propulsion in a cruising state 41. The aerofoils 3a, 3b can be attached in the upper region of the fuselage 13, based on a vertical axis or yaw axis of the aircraft 1, so that during ground operation of the aircraft 1, a relatively great distance is provided between the ground and the aerofoils 3a, 3b. As a result, the lifting rotors 5 can also be arranged under the aerofoils 3a, 3b. The aerofoils 3a, 3b can also be oriented anhedrally. A person skilled in aircraft construction understands the term "anhedrally" as meaning a negative V position of aerofoils 3a, 3b when viewed in the longitudinal direction 50 of the fuselage 13 or in the flight direction. This means that the aerofoils 3a, 3b are lowered from the fuselage 13 to their ends based on the vertical axis of the aircraft 1. The maneuverability in particular of the aircraft 1 can be increased by a negative V position. Both a negative V position and a positive V position of the aerofoils can be provided in all the embodiments described above and below. In the positive V position, the aerofoils 3 ascend from the fuselage 13 to their ends based on the vertical axis of the aircraft 1 so that a view in the longitudinal direction 50 gives the impression of a V shape of the aerofoils 3. It is possible for the front pair of aerofoils 3a to have a different wingspan compared to the rear pair of aerofoils 3b. Consequently, a greater aerodynamic effectiveness can be achieved with a suitable arrangement of the aerofoils. For example, the front pair of aerofoils 3a has a smaller wingspan than the rear pair of aerofoils 3b. Furthermore, the front pair of aerofoils 3a can be provided on the fuselage 13 at a different height along the vertical axis of the aircraft 1. For example, the front pair of aerofoils 3a is arranged higher on the fuselage 13 with respect to the vertical axis than the rear pair of aerofoils 3b, as a result of which with a possible separation of the flow on the front pair of aerofoils 3b, the rear pair of aerofoils 3b continues to generate lift so that the aircraft 1 is able to perform an aerodynamically or mechanically stable flight.

In all the embodiments with a tandem wing structure, i.e. with two pairs of aerofoils, the first pair of aerofoils 3a and the second pair of aerofoils can have a different wing area. A person skilled in aircraft construction understands "wing area" as meaning the area which is described by the wing outline, for example in a plan view.

Figure 14:
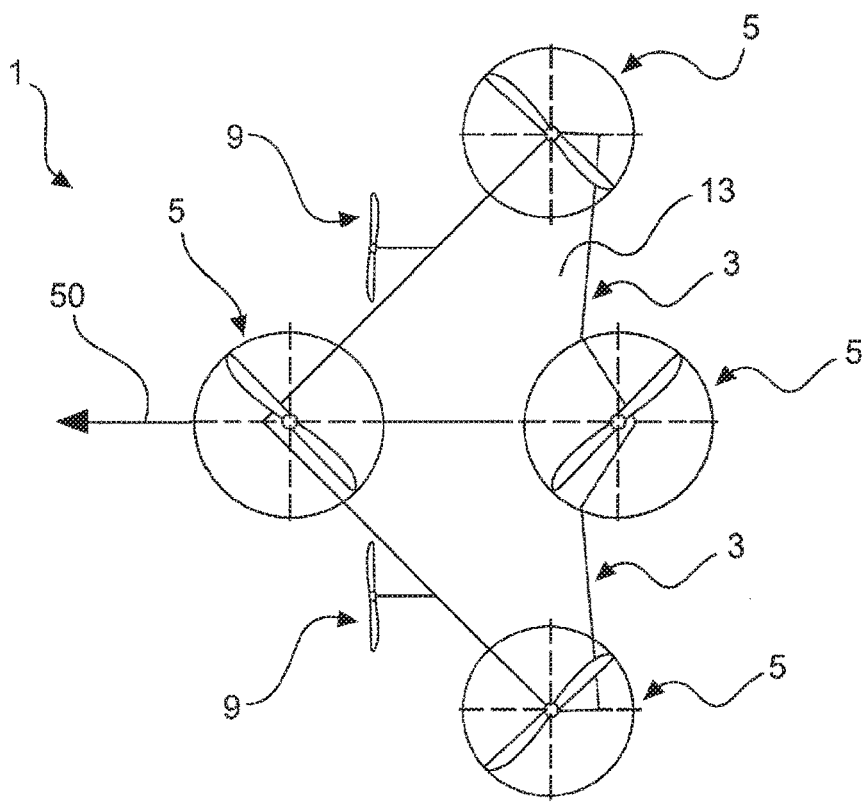
FIG. 14 is a plan view of an aircraft according to the invention in which the fuselage is integrated into the aerofoils.

FIG. 14 is a plan view of an aircraft 1 in which the fuselage 13 simultaneously forms the aerofoils 3. This means that the fuselage 1 is integrated into the aerofoils 3. This type of configuration is also known as a flying wing configuration. In a plan view of the aircraft 1, the fuselage 13 or the aerofoils 3 have a delta shape or triangular shape. In other words, the trailing edge sweep of the aerofoils 3 is significantly smaller than the leading edge sweep. It is possible to provide on the fuselage 13 or on the aerofoils 3 four lifting rotors 5 which are arranged such that the aircraft 1 can be brought into a hover flight state 40. In this respect, one lifting rotor 5 is attached to a front point and one lifting rotor 5 is attached to a rear edge of the fuselage 13. Two further lifting rotors 5 are respectively attached to the two ends of the aerofoils in a wingspan direction of the aerofoils 3 or in a transverse direction 60 to the flight direction. To keep the aircraft 1 balanced during the hover flight state 40, the lifting rotors 5 can be operated at different intensities. In other words, the thrust of each lifting rotor 5 can be adjusted individually so that in addition to allowing a balanced state during hover flight, a tilting of the aircraft 1, for example about the longitudinal direction 50 or about a transverse axis 60 of the aircraft 1, is also possible. Furthermore, a respective thrust drive 9 can be provided on each of the aerofoils 3, said thrust drives 9 being attached to the respective leading edges of the aerofoils 3. However, the thrust drives 9 can also be attached to the respective trailing edges of the aerofoils 3. In any case, the thrust drives 9 are arranged such that propulsion is generated in the longitudinal direction 50 of the aircraft 1.

Figure 15:
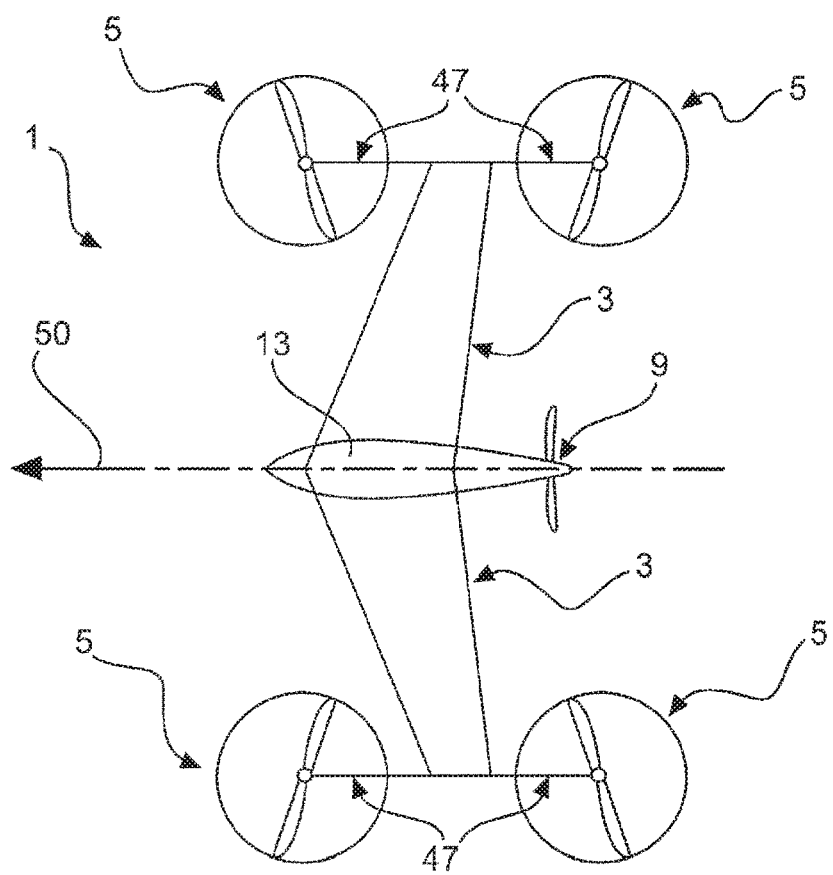
FIG. 15 is a plan view of an aircraft according to the invention with a support structure which has an elongate fuselage, a pair of aerofoils and lifting rotors attached to connecting elements.

FIG. 15 is a plan view of an aircraft 1 with a support structure 27, the support structure 27 having an elongate fuselage 13, a pair of aerofoils 3 and connecting elements 47. The connecting elements 47 are fitted, for example as bar-shaped elements or beam-shaped elements, to the ends of the aerofoils 3 of the pair of aerofoils 3 and are oriented parallel to the longitudinal direction 50 or parallel to the elongate fuselage 13 of the aircraft 1. Two lifting rotors 5 are respectively attached, offset relative to one another in the longitudinal direction 50, to the connecting elements 47, i.e. to the bar-shaped elements. Four lifting rotors 5 thereby generate the corresponding lift for a hover flight state 40. A thrust drive 9 for the propulsion of the aircraft 1 while cruising 41 is attached to the fuselage 13.

Figure 16:
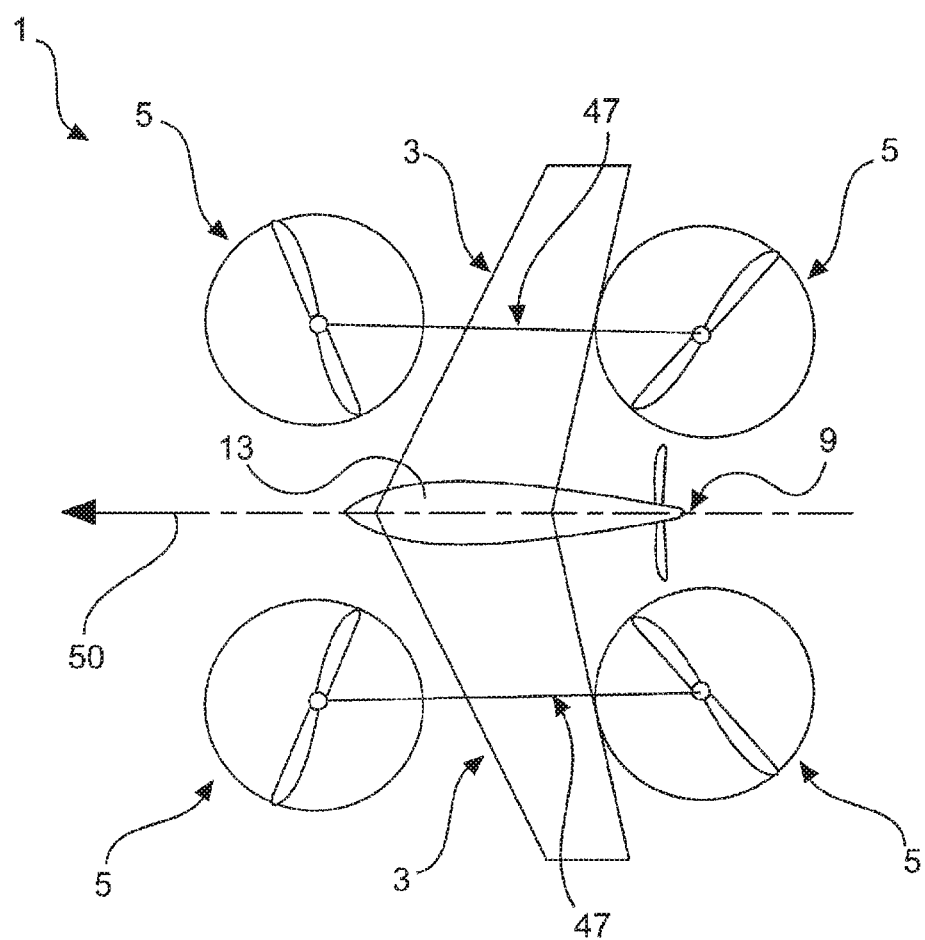
FIG. 16 is a plan view of an aircraft according to the invention with a support structure which has an elongate fuselage, a pair of aerofoils and connecting elements which are arranged in the center of the aerofoils and to which lifting rotors are attached.

As shown in FIG. 16, instead of being attached to the ends of the aerofoils 3, the connecting elements 47 can also be attached to approximately the center of each of the aerofoils 3. In other words, a first connecting element 47 is attached, for example, parallel to the longitudinal direction 50 or parallel to the elongate fuselage 13 approximately centrally between the fuselage 13 and the end of the first aerofoil of the pair of aerofoils 3 such that a first end of the first connecting element 47 projects beyond the leading edge of the first aerofoil 3 and a second end of the first connecting element 47 projects beyond the trailing edge of the first aerofoil 3. Correspondingly, a second connecting element 47 is attached parallel to the longitudinal direction 50 or parallel to the elongate fuselage 13 approximately centrally between the fuselage 13 and the end of the second aerofoil 3 of the pair of aerofoils 3 such that a first end of the second connecting element 47 projects beyond the leading edge of the second aerofoil 3 and a second end of the second connecting element 47 projects beyond the trailing edge of the second aerofoil 3. Two lifting rotors 5 are respectively attached, being offset relative to one another in the longitudinal direction 50, to the connecting elements 47, i.e. to the bar-shaped or beam-shaped elements. These lifting rotors 5 are attached, for example, to the respective ends, projecting beyond the aerofoils 3, of the two connecting elements 47 so that the lifting rotors 5 are not located above the aerofoils 3, but they project beyond them along the longitudinal direction 50 of the fuselage 13. The region above the aerofoils 3 describes the region over the aerofoils 3 in respect of the vertical axis usually used in aircraft construction.

Figure 17:
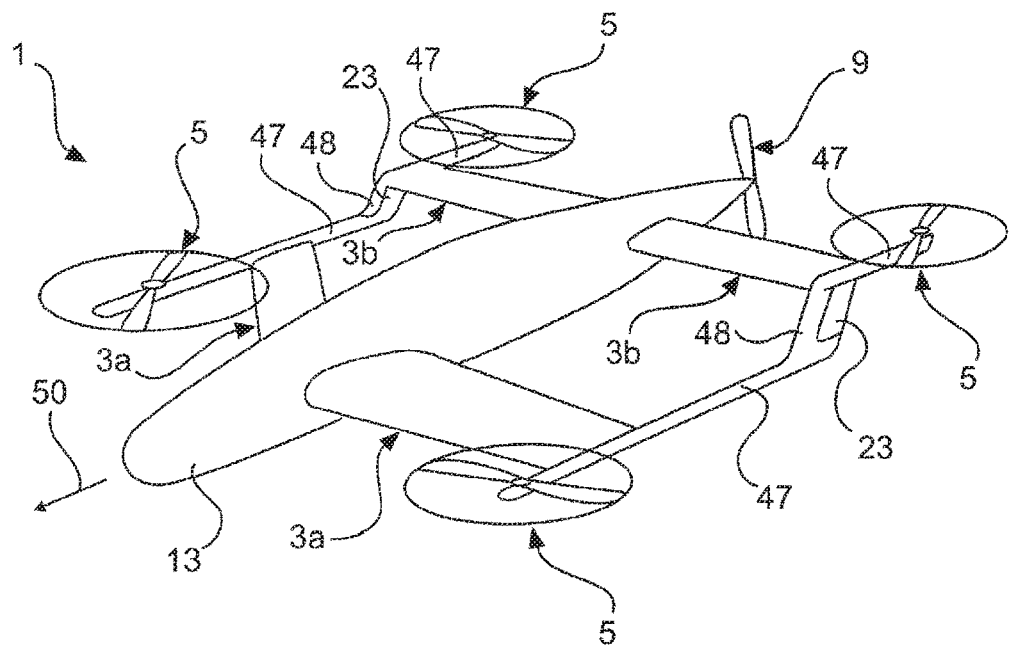
FIG. 17 is a perspective view of an aircraft with a support structure which has a fuselage, two pairs of aerofoils arranged in tandem in the longitudinal direction and two elongate connecting elements arranged parallel to the longitudinal direction.

FIG. 17 is a perspective view of an aircraft 1 with a support structure 27, comprising a fuselage 13, two pairs of aerofoils 3a, 3b arranged in tandem in the longitudinal direction 50, and two elongate or bar-shaped connecting elements 47 arranged parallel to the longitudinal direction 50. The pair of aerofoils 3a attached in the front region of the elongate fuselage 13 with respect to the flight direction or the longitudinal direction 50 has a positive sweep, whereas the pair of aerofoils 3b attached in the rear region of the elongate fuselage 13 does not have a sweep or has a smaller sweep compared to the sweep of the pair of aerofoils 3a attached in the front region of the elongate fuselage 13. For example, the sweep of the first pair of aerofoils 3a is between 20 and 30 degrees. The pairs of aerofoils 3a, 3b can be attached to the fuselage 13 at different heights with respect to the vertical axis of the aircraft 1. In other words, this means that to an observer who is looking in the longitudinal direction 50 or in the flight direction of the aircraft 1, the first pair of aerofoils 3a is arranged under the second pair of aerofoils 3b. The aerofoils of the two pairs of aerofoils 3a, 3b are thus arranged offset along the vertical axis of the aircraft 1. Four connecting elements 47 are attached to the respective ends of the aerofoils 3a, 3b, which connecting elements extend parallel to the longitudinal direction 50 of the fuselage 13. Since the aerofoils 3a, 3b are attached to the fuselage 13 at different heights along the vertical axis on a first side of the fuselage, for example on the left fuselage side, the connecting elements 47 which are attached to the ends of the aerofoils 3a, 3b on the left fuselage side are also located at different heights. In this respect, a connecting piece 48 can be provided which interconnects the connecting elements 47 on one side of the fuselage. The connecting piece 48 can be a plate-shaped or disc-shaped component which comprises a tail unit 23 in particular, such as the rudder unit of the aircraft 1. The height difference between the two pairs of aerofoils 3a, 3b, which results in respect of the vertical axis, can be bridged by the provision of the connecting piece 48 to accommodate the rudder unit. Lifting rotors 5 are again respectively provided on the connecting elements 47. One lifting rotor 5 is attached to each of the four connecting elements 47. Two lifting rotors 5, offset relative to one another in the longitudinal direction 50, are thus positioned and oriented on both sides of the elongate fuselage 13 such that a sum of the lifting forces generated by the lifting rotors passes approximately through a center of gravity of the aircraft 1, particularly when all the lifting rotors 5 are operated uniformly at the same time. Furthermore, a thrust drive 9 to generate the propulsion of the aircraft 1 is provided in the tail region of the elongate fuselage 13.

Figure 18:
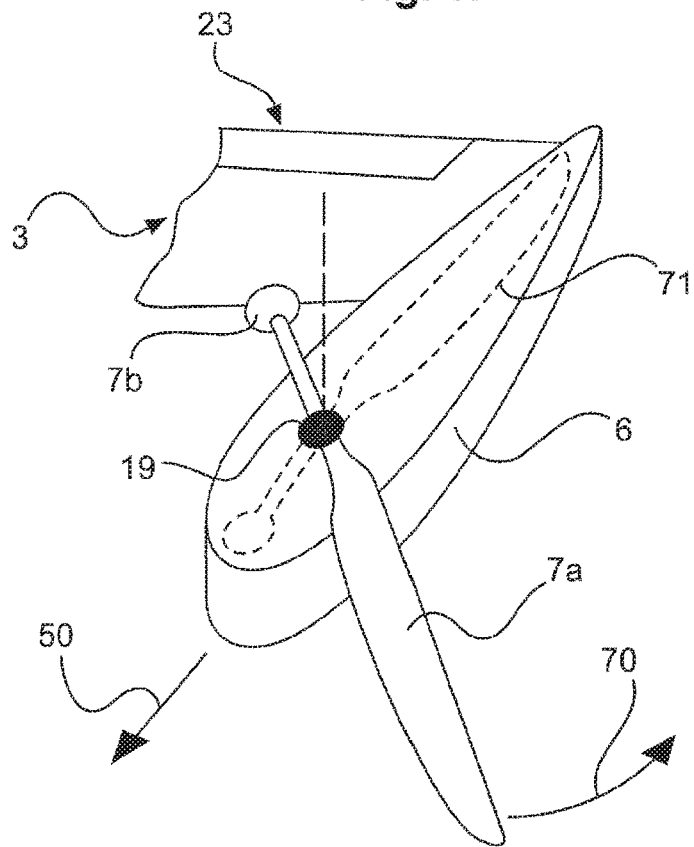
FIG. 18 is a perspective view of an elongate nacelle, attached to an aerofoil, with a single-blade propeller.

FIG. 18 is a perspective view of an elongate nacelle 6 with a single-blade propeller 7a. This view also shows a rotational direction 70 of the single-blade propeller 7a. The single-blade propeller 7a has on an end projecting beyond its rotor shaft 19 a weight 7b which acts as a counter-weight to the single-blade propeller. Thus, the single-blade propeller 7a has a first portion between the weight 7b and the rotor shaft 19 and a second portion between the end of the blade of the single-blade propeller 7a and the rotor shaft 19. Both portions of the single-blade propeller 7a are therefore on different sides of the rotor shaft 19. The length of the first portion of the single-blade propeller 7a measures, for example, between a quarter and a third of the overall length of the single-blade propeller 7a, whereas the length of the second portion of the single-blade propeller 7a measures between two-thirds and three-quarters of the overall length of the single-blade propeller 7a. The single-blade propeller 7a can be, for example, part of a lifting rotor 5 of the aircraft 1 which contributes towards the lift of the aircraft 1 for a hover flight state 40. The single-blade propeller 7a can be brought into a parallel orientation to the elongate nacelle 6 for a cruising state 41, so that when stationary, the single-blade propeller 7a is oriented substantially parallel to the flight direction or to the longitudinal direction 50 of the aircraft 1. The single-blade propeller 7a and the nacelle 6 are then oriented in alignment with one another, which reduces the air resistance while the aircraft 1 is cruising. In turn, the nacelle 6 can be attached to one end of an aerofoil 3. In a cruising state, the lift can be generated by an aerofoil 3 provided with a profile which generates a dynamic lift. Propulsion is ensured by a thrust drive not shown in FIG. 18. The single-blade propeller 7a shown in FIG. 18 can be used in all the previously described embodiments, for example as part of a lifting rotor 5.

Two propellers can also be arranged one above the other. This applies to single-blade propellers and to double-blade propellers or multi-blade propellers. During hover flight, the lower propeller can rotate, for example, in the same and/or in the opposite rotational direction as the upper propeller. The angular momentum can be reduced by an opposite rotational direction. Two superimposed propellers each with its own motor can also be provided, thereby making it possible to increase redundancy and thus safety. If one motor fails, the aircraft 1 could continue to hover. In a further embodiment, it can be provided that the propellers can be stowed behind an aerodynamic casing, for example by moving into the nacelle 6, so that the resistance can be further reduced. For this purpose, for example, flaps can be provided on the nacelles 6 which can be closed after the propeller has moved into the nacelles 6.

In a further embodiment, the propeller can be mounted in an articulated manner. This can be advantageous particularly during forwards flight of the aircraft 1, since rolling moments due to an asymmetrical flow on the propellers are not transferred thereby onto the aircraft 1. Furthermore, bending moments arising in the propeller blade would stress the motor hub to a lesser extent, because the bending moments would remain in the blade. This applies both to a double-blade propeller and to a single-blade propeller.

Embodiments of the proposed aircraft 1 can be configured with a very lightweight structure, particularly compared to conventional aircraft capable of vertical take-off, and at the same time they can allow high cruising speeds. The multi-copter-like configuration with a plurality of lifting rotors can allow a simple and efficient hover flight mode. Furthermore, it is easily possible to change from a vertical to a horizontal flight mode. The controls and control algorithms proposed for this purpose can be configured relatively simply. The proposed aircraft concept can be implemented with simple, economical and robust drive motors and power transmission mechanisms. For example, the lifting rotors can be operated by simple electric motors, only the speed of which has to be controlled, The thrust drive can be driven by any type of simple motor and, compared to conventional aircraft, can have a substantially lower power, since in particular the horizontal maximum thrusts required for the take-off of an aircraft do not have to be delivered. Overall, the proposed aircraft can have a high payload capacity.

The invention claimed is:

1. An aircraft, comprising:
   a support structure;
   a wing structure;
   at least three lifting rotors; and
   at least one thrust drive;
   wherein the wing structure is attached to the support structure or is part of the support structure,
   wherein the wing structure is configured to generate a lifting force for the aircraft during horizontal motion of the aircraft using at least one aerofoil which is provided with a profile generating a dynamic lift,
   wherein each of the at least three lifting rotors is attached to the support structure, has a propeller and is configured to rotate the propeller to generate a lifting force, acting in the vertical direction, for the aircraft,
   wherein the propeller of each of the at least three lifting rotors has exactly two propeller blades,
   wherein the at least one thrust drive is configured to generate a thrust force, acting in the horizontal direction, on the support structure, and
   wherein the at least one thrust drive generates a horizontally-acting thrust such that the aircraft is accelerated to a high cruising speed independently of the lifting rotors after the lifting rotors have stopped.

2. The aircraft according to claim 1, wherein the support structure, together with the wing structure, is configured as a tandem wing structure with an elongate fuselage and two pairs, arranged horizontally in tandem, of aerofoils which project transversely from the fuselage.

3. The aircraft according to claim 2, wherein one of the at least three lifting rotors is respectively arranged on each of the at least one aerofoil.

4. The aircraft according to claim 2, further comprising a nacelle, arranged on each of the at least one aerofoil, on which one of the at least three lifting rotors is respectively arranged.

5. The aircraft according to claim 1, wherein the at least three lifting rotors are configured such that a plane of rotation in which the propeller blades of a respective lifting rotor rotate is stationary relative to a motor-driven rotor shaft of the respective lifting rotor.

6. The aircraft according to claim 5, wherein the propeller blades of the respective lifting rotor are rigidly connected to the motor-driven rotor shaft.

7. Aircraft according to claim 5, wherein the propeller blades of the respective lifting rotor are swivelably connected to the motor-driven rotor shaft such that a pitch of the propeller blades can be varied.

8. The aircraft according to claim 1, having at least four lifting rotors.

9. The aircraft according to claim 1, wherein the sum of the lifting forces which can be generated by the at least three lifting rotors passes substantially through a center of gravity of the aircraft; and
   wherein a neutral point of the wing structure relative to the center of gravity of the aircraft can be suitably positioned for a horizontal flight.

10. The aircraft according to claim 1, wherein the at least three lifting rotors are each configured to stop respective propeller blades of a respective lifting rotor in a position relative to the support structure.

11. The Aircraft according to claim 1, wherein the at least three lifting rotors and the thrust drive are driven by motors which are controllable independently of one another.

12. The aircraft according to claim 1, wherein each of the at least three lifting rotors is driven by an electric motor.

13. The aircraft according to claim 12, wherein the thrust drive is driven by an internal combustion engine and the internal combustion engine is coupled to a generator to provide electrical energy to the electric motors of the at least three lifting rotors.

14. The aircraft according to claim 1, wherein the support structure together with the wing structure is configured as a tandem wing structure with an elongate fuselage and two pairs of aerofoils which are arranged horizontally in tandem and project from the fuselage.

* * * * *